United States Patent
Zhou et al.

(10) Patent No.: US 10,060,746 B2
(45) Date of Patent: Aug. 28, 2018

(54) METHODS AND SYSTEMS FOR DETERMINING A STATE OF AN UNMANNED AERIAL VEHICLE

(71) Applicant: SZ DJI TECHNOLOGY CO., LTD, Shenzhen (CN)

(72) Inventors: Guyue Zhou, Shenzhen (CN); Shuo Yang, Shenzhen (CN); Ang Liu, Shenzhen (CN)

(73) Assignee: SZ DJI TECHNOLOGY CO., LTD, Shenzhen (CN)

(*) Notice: Subject to any disclaimer, the term of this patent is extended or adjusted under 35 U.S.C. 154(b) by 38 days.

(21) Appl. No.: 14/949,794

(22) Filed: Nov. 23, 2015

(65) Prior Publication Data

US 2016/0076892 A1 Mar. 17, 2016

Related U.S. Application Data

(63) Continuation-in-part of application No. PCT/CN2014/073985, filed on Mar. 24, 2014.

(51) Int. Cl.

| | |
|---|---|
| *G05D 1/10* | (2006.01) |
| *G01C 21/20* | (2006.01) |
| *B64C 39/02* | (2006.01) |
| *B64D 47/08* | (2006.01) |
| *G01C 21/16* | (2006.01) |

(52) U.S. Cl.
CPC ............ *G01C 21/20* (2013.01); *B64C 39/024* (2013.01); *B64D 47/08* (2013.01); *G01C 21/165* (2013.01); *G05D 1/101* (2013.01); *G05D 1/102* (2013.01); *B64C 2201/141* (2013.01)

(58) Field of Classification Search
CPC ....... G01C 21/165; G01C 21/20; G05D 1/102

USPC ............................................................ 701/3
See application file for complete search history.

(56) References Cited

U.S. PATENT DOCUMENTS

| | | | |
|---|---|---|---|
| 2010/0235129 A1* | 9/2010 | Sharma | G01S 7/4972 702/97 |
| 2013/0046459 A1 | 2/2013 | Itakura | |
| 2013/0182906 A1* | 7/2013 | Kojo | G01S 11/12 382/103 |

FOREIGN PATENT DOCUMENTS

| | | |
|---|---|---|
| CA | 2648636 A1 | 12/2007 |
| CN | 101598556 A | 12/2009 |
| CN | 102435188 A | 5/2012 |

(Continued)

OTHER PUBLICATIONS

Machine Translation: Zhou et al., Chinese Patent Publication CN103914065A, Jul. 9, 2014, Chinese Patent Office.*

(Continued)

*Primary Examiner* — Nadeem Odeh
(74) *Attorney, Agent, or Firm* — Anova Law Group, PLLC

(57) ABSTRACT

The present invention provides methods and systems related to determine a state of the UAV by updating a determined state of UAV with a relative proportional relationship. The UAV may be provided with a monocular camera, a proximity sensor and a processor. The processor may determine external state information of the UAV based on image data captured by the monocular camera, and calculate a relative proportional relationship to be applied to the determined external state information. The updated external state information of the UAV may be more precise or even equal to the actual state information of the UAV, thus enabling more accurate control and navigation for the autonomous flight.

20 Claims, 12 Drawing Sheets

(56) References Cited

FOREIGN PATENT DOCUMENTS

| CN | 103365297 A | 10/2013 |
|----|-------------|---------|
| CN | 103424114 A | 12/2013 |
| CN | 103644904 A | 3/2014 |
| CN | 103914065 A | 7/2014 |
| EP | 2071353 A2 | 6/2009 |

OTHER PUBLICATIONS

Zhang et al., Obstacle Detection for Low Flying UAS Using Monocular Camera, May 2012, Instrumentation and Measurement Technology Conference (I2MTC), 2012 IEEE International.*

International search report and written opinion dated Dec. 31, 2014 for PCT/CN2014/073985.

Chen, et al. Sparse-optical-flow-based autonomous navigation scheme for unmanned aerial vehicles. Acta Aeronautica Et Astronautica Sinica. May 2008; 29:S127-S134. (in Chinese with English abstract).

Feng, et al. Algorithm for monocular visual odometiy/SINS integrated navigation. Journal of Chinese Inertial Technology. Jun. 2011; 19(3):302-306.

Yuan, et al. Visual steering of UAV in unknown environments. The 2009 IEEE/RSJ International Conference on Intelligent Robots and Systems. Oct. 11-15, 2009; St. Louis, USA. 3906-3911.

* cited by examiner

METHODS AND SYSTEMS FOR DETERMINING A STATE OF AN UNMANNED AERIAL VEHICLE

CROSS-REFERENCE

This application is a continuation-in-part application of International Application No. PCT/CN2014/073985, filed on Mar. 24, 2014, the content of each of which is hereby incorporated by reference in their entirety.

BACKGROUND OF THE INVENTION

Aerial vehicles, such as unmanned aerial vehicles (UAVs), have been developed for a wide range of applications including surveillance, search and rescue operations, exploration, and other fields. Such UAVs can often be controlled and navigated by a remote controller. In some instances, UAVs can be vehicles capable of sensing and navigating through an environment without guidance from a human controller.

One commonly used autonomous navigating technique is visual navigation by virtue of cameras. The UAVs may autonomously determine its state information, including a height, a speed, a direction, a coordinate and a distance to certain object, during visually navigated flight. However, a deviation may occur between the autonomously determined state information and the actual state. The deviation becomes larger over time, thus a reliability of the visual navigation may be reduced.

SUMMARY OF THE INVENTION

A need exists for improved methods and systems for determining a state of UAVs during visual navigation. The present invention provides methods and systems related to determine a state of the UAV by updating the determined state information of UAV with a relative proportional relationship between a first reference frame (e.g., a local or camera-based reference frame) or coordinates under a first coordinate system (e.g., camera coordinates) and a second reference frame (e.g., a global reference frame) or coordinates under a second coordinate system (e.g., world coordinates). The UAV may be provided with a monocular camera unit, a proximity sensor and one or more processors. The one or more processors may be configured to determine external state information of the UAV based on image data captured by the monocular camera unit, and calculate a relative proportional relationship to be applied to the determined external state information. The relative proportional relationship may be calculated based at least in part on (1) a predetermined positional relationship between the monocular camera unit and the proximity sensor and (2) a proximity data about the environment of the UAV. The processor may be configured to update the determined external state information of the UAV at least by applying the relative proportional relationship.

In one aspect of the present disclosure, a method determining an external state of an unmanned aerial vehicle (UAV) is described. The method may include determining, individually or collectively by one or more processors onboard the UAV, external state information of the UAV based on image data of an environment of the UAV captured by a monocular camera unit onboard the UAV; calculating, individually or collectively by the one or more processors onboard the UAV, a relative proportional relationship to be applied to the external state information of the UAV based at least in part on (1) a predetermined positional relationship between the monocular camera unit and a proximity sensor unit and (2) proximity data about the environment of the UAV that is acquired by the proximity sensor unit; and updating, individually or collectively by the one or more processors onboard the UAV, the external state information of the UAV at least by applying the relative proportional relationship to the external state.

In some embodiments, the relative proportional relationship may comprise a scale factor.

In some embodiments, the proximity sensor unit may comprise at least one of a lidar sensor, an ultrasound sensor, or an infrared sensor.

In some embodiments, the proximity data may include a distance to an external object within the environment.

In some embodiments, the external state information may comprise distance information of the UAV relative to one or more external objects within the environment. In other embodiments, the external state information comprises position information of one or more external objects within the environment or position information of the UAV.

In some embodiments, the external state information may include a plurality of feature points, each associated with a first set of coordinates under a first reference frame. Updating the external state information may include applying the relative proportional relationship to the first set of coordinates associated with at least one of the plurality of feature points to obtain a second set of coordinates under a second reference frame. In some embodiments, the first reference frame may be a local reference frame, and the second reference frame may be a global reference frame.

In some embodiments, the proximity data may include proximity information for a first feature point of the plurality of feature points and may not include proximity information for a second feature point of the plurality of feature points. Determining external state information of the UAV may comprise: extracting the plurality of feature points from the image data; and determining the first sets of coordinates respectively associated with the plurality of feature points under the first reference frame.

In some embodiments, calculating the relative proportional relationship may comprise: determining a second set of coordinates under a second reference frame for the first feature point based on the proximity information for the first feature point and the predetermined positional relationship between the monocular camera unit and the proximity sensor unit; and using the first set of coordinates and the second set of coordinates for the first feature point to determine the relative proportional relationship.

In some embodiments, updating the external state information may comprise applying the relative proportional relationship to the first set of coordinates associated with the second feature point to obtain a second set of coordinates for the second feature point under a second reference frame. In some embodiments, the first reference frame may be a local reference frame, and the second reference frame may be a global reference frame.

In some embodiments, determining external state information of the UAV may comprise: obtaining historical state information of the UAV or the monocular camera unit; obtaining the image data comprising a current image and an historical image preceding the current image; predicting a matching feature point in the current image corresponding to a target feature point in the historical image according to the historical state information; and calculating, based on the matching feature point, external state information of the UAV or the monocular camera unit. Predicting the matching feature point in the current image may comprise: predicting a coordinate position of a target feature point of the historical image in the current image according to the historical state information; and selecting a feature point that is closest to the coordinate position as the matching feature point in the current image. Updating the external state information of the UAV may comprise applying a Kalman filter to the external state information according to a pre-established state model and a pre-established measurement model.

In some embodiments, the monocular camera unit may comprise a monocular panoramic camera and a reflection mirror for reflecting external light rays to the monocular camera. The method may further comprise calibrating the image data according to a pre-determined calibration model before determining the external state information. Calibrating the image data may comprise obtaining a coordinate mapping relationship between arbitrary point in an external space and a corresponding point in an image acquired by the monocular camera unit according to the pre-established calibration model corresponding to a reflection mirror of the monocular camera unit; and modifying the image according to the coordinate mapping relationship.

In another aspect of the present disclosure, system for determining an external state of an unmanned aerial vehicle (UAV) is described. The system may include a monocular camera unit configured to capture image data of an environment of the UAV; a proximity sensor unit configured to acquire proximity data about the environment of the UAV; and one or more processors configured to, individually or collectively: determine external state information of the UAV based on the image data captured by the monocular camera unit; calculate a relative proportional relationship to be applied to the external state information of the UAV based at least in part on (1) a predetermined positional relationship between the monocular camera unit and the proximity sensor unit and (2) the proximity data; and update the external state information of the UAV at least by applying the relative proportional relationship to the external state information.

In some embodiments, the relative proportional relationship may comprise a scale factor.

In some embodiments, the proximity sensor unit may comprise at least one of a lidar sensor, an ultrasound sensor, or an infrared sensor.

In some embodiments, the proximity data may include a distance to an external object within the environment.

In some embodiments, the external state information may comprise distance information of the UAV relative to one or more external objects within the environment. In other embodiments, the external state information may comprise position information of one or more external objects within the environment or position information of the UAV.

In some embodiments, external state information may include a plurality of feature points, each associated with a first set of coordinates under a first reference frame. Updating the external state information may include applying the relative proportional relationship to the first set of coordinates associated with at least one of the plurality of feature points to obtain a second set of coordinates under a second reference frame. In some embodiments, the first reference frame may be a local reference frame, and the second reference frame may be a global reference frame.

In some embodiments, the proximity data may include proximity information for a first feature point of the plurality of feature points and may not include proximity information for a second feature point of the plurality of feature points. Determining external state information of the UAV may comprise: extracting the plurality of feature points from the image data; and determining the first sets of coordinates respectively associated with the plurality of feature points under the first reference frame.

In some embodiments, calculating the relative proportional relationship may comprise: determining a second set of coordinates under a second reference frame for the first feature point based on the proximity information for the first feature point and the predetermined positional relationship between the monocular camera unit and the proximity sensor unit; and using the first set of coordinates and the second set of coordinates for the first feature point to determine the relative proportional relationship.

In some embodiments, updating the external state information may comprise applying the relative proportional relationship to the first set of coordinates associated with the second feature point to obtain a second set of coordinates for the second feature point under a second reference frame. In some embodiments, the first reference frame may be a local reference frame, and the second reference frame may be a global reference frame.

In some embodiments, determining external state information of the UAV may comprise: obtaining historical state information of the UAV or the monocular camera unit; obtaining the image data comprising a current image and an historical image preceding the current image; predicting a matching feature point in the current image corresponding to a target feature point in the historical image according to the historical state information; and calculating, based on the matching feature point, external state information of the UAV or the monocular camera unit. Predicting the matching feature point in the current image may comprise: predicting a coordinate position of a target feature point of the historical image in the current image according to the historical state information; and selecting a feature point that is closest to the coordinate position as the matching feature point in the current image. Updating the external state information of the UAV may comprise applying a Kalman filter to the external state information according to a pre-established state model and a pre-established measurement model.

In some embodiments, the monocular camera unit may comprise a monocular panoramic camera and a reflection mirror for reflecting external light rays to the monocular camera. The one or more processors may be further configured to, individually or collectively, calibrating the image data according to a pre-determined calibration model before determining the external state information. Calibrating the image data may comprise obtaining a coordinate mapping relationship between arbitrary point in an external space and a corresponding point in an image acquired by the monocular camera unit according to the pre-established calibration model corresponding to a reflection mirror of the monocular camera unit; and modifying the image according to the coordinate mapping relationship In another aspect of the present disclosure, one or more non-transitory computer-readable storage media having stored thereon executable instructions is described. The executable instructions that, when executed by one or more processors of a computer system onboard an unmanned aerial vehicle (UAV), may cause the computer system to at least: determine external state information of the UAV based on image data of an environment of the UAV captured by a monocular camera unit onboard the UAV; calculate a relative proportional relationship to be applied to the external state information of the UAV based at least in part on (1) a predetermined positional relationship between the monocular camera unit and a proximity sensor unit and (2) proximity data about the environment of the UAV that is acquired by the proximity sensor unit; and update the external state information of the UAV at least by applying the relative proportional relationship to the external state information.

In some embodiments, the relative proportional relationship may comprise a scale factor.

In some embodiments, the proximity sensor unit may comprise at least one of a lidar sensor, an ultrasound sensor, or an infrared sensor.

In some embodiments, the proximity data may include a distance to an external object within the environment.

In some embodiments, the external state information may comprise distance information of the UAV relative to one or more external objects within the environment. In other embodiments, the external state information may comprise position information of one or more external objects within the environment or position information of the UAV.

In some embodiments, the external state information may include a plurality of feature points, each associated with a first set of coordinates under a first reference frame. Updating the external state information may include applying the relative proportional relationship to the first set of coordinates associated with at least one of the plurality of feature points to obtain a second set of coordinates under a second reference frame. In some embodiments, the first reference frame may be a local reference frame, and the second reference frame may be a global reference frame.

In some embodiments, the proximity data may include proximity information for a first feature point of the plurality of feature points and may not include proximity information for a second feature point of the plurality of feature points. Determining external state information of the UAV may comprise: extracting the plurality of feature points from the image data; and determining the first sets of coordinates respectively associated with the plurality of feature points under the first reference frame.

In some embodiments, calculating the relative proportional relationship may comprise: determining a second set of coordinates under a second reference frame for the first feature point based on the proximity information for the first feature point and the predetermined positional relationship between the monocular camera unit and the proximity sensor unit; and using the first set of coordinates and the second set of coordinates for the first feature point to determine the relative proportional relationship.

In some embodiments, updating the external state information may comprise applying the relative proportional relationship to the first set of coordinates associated with the second feature point to obtain a second set of coordinates for the second feature point under a second reference frame. In some embodiments, the first reference frame may be a local reference frame, and the second reference frame may be a global reference frame.

In some embodiments, determining external state information of the UAV may comprise: obtaining historical state information of the UAV or the monocular camera unit; obtaining the image data comprising a current image and an historical image preceding the current image; predicting a matching feature point in the current image corresponding to a target feature point in the historical image according to the historical state information; and calculating, based on the matching feature point, external state information of the UAV or the monocular camera unit. Predicting the matching feature point in the current image may comprise: predicting a coordinate position of a target feature point of the historical image in the current image according to the historical state information; and selecting a feature point that is closest to the coordinate position as the matching feature point in the current image. Updating the external state information of the UAV may comprise applying a Kalman filter to the external state information according to a pre-established state model and a pre-established measurement model.

In some embodiments, the monocular camera unit may comprise a monocular panoramic camera and a reflection mirror for reflecting external light rays to the monocular camera. The method may further comprise calibrating the image data according to a pre-determined calibration model before determining the external state information. Calibrating the image data may comprise obtaining a coordinate mapping relationship between arbitrary point in an external space and a corresponding point in an image acquired by the monocular camera unit according to the pre-established calibration model corresponding to a reflection mirror of the monocular camera unit; and modifying the image according to the coordinate mapping relationship In some embodiments, the executable instructions may further cause the computer system to calibrating the image data according to a pre-determined calibration model before determining the external state information. Calibrating the image data may comprise obtaining a coordinate mapping relationship between arbitrary point in an external space and a corresponding point in an image acquired by the monocular camera unit according to the pre-established calibration model corresponding to a reflection mirror of the monocular camera unit; and modifying the image according to the coordinate mapping relationship.

It shall be understood that different aspects of the invention can be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

The methods and systems described herein provide an effective approach to autonomously determine and update external state information of a UAV during visual navigation. The visually determined external state information of the UAV, based on image data of an environment of the UAV captured by a monocular camera unit onboard the UAV, may be updated by using a relative proportional relationship. The relative proportional relationship may be calculated based on (1) a predetermined positional relationship between the monocular camera unit and a proximity sensor onboard the UAV and (2) proximity data about the environment of the UAV that is acquired by the proximity sensor. In some embodiments, the relative proportional relationship can include a scale factor or a transformation matrix between a first reference frame (e.g., local or camera-based reference frame) or coordinates under a first coordinate system (e.g., camera coordinates) and a second reference frame (e.g., global reference frame) or coordinates under a second coordinate system (e.g., world coordinates). The updated external state information of the UAV may provide a better estimation of the actual state information of the UAV compared with the visually determined external state information, thus enabling more accurate control and navigation for the autonomous flight. With the methods and systems of present invention, the deviation between the visually determined external state information and the actual state of the UAV may be reduced, and the reliability of the visual navigation may be improved.

Figure 1:
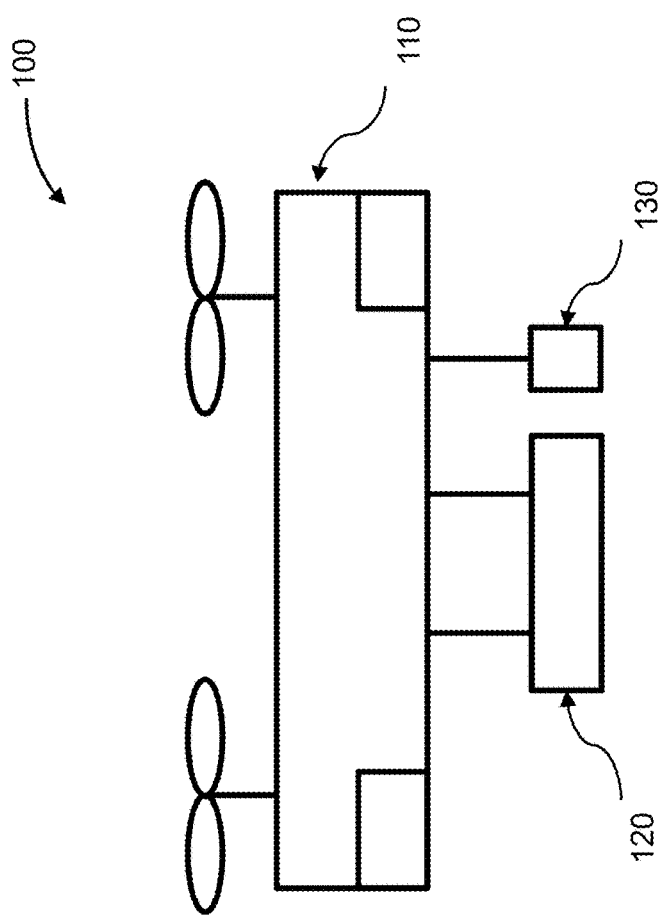
FIG. 1 shows an example of an unmanned aerial vehicle (UAV) that is visually navigated by virtue of a monocular camera, in accordance with some embodiments.

FIG. 1 shows an example of an unmanned aerial vehicle (UAV) 100 that is visually navigated by virtue of a monocular camera unit in accordance with an embodiment of the invention. The UAV 110 may have a body. In some instances, the body may be a central body which may have one or more branching members, or "arms." The arms may extend outward from the body in a radial manner and be joined via the body. The number of arms may match the number of propulsion units, or rotors, of the UAV. The body may comprise a housing. The housing may enclose one or more components of the UAV within the housing. In some instances, one or more electrical components of the UAV may be provided within the housing. For example, a flight controller of the UAV may be provided within the housing. The flight controller may control operation of one or more propulsion units of the UAV.

The monocular camera unit 120 may be rigidly coupled to the UAV 110. Alternatively, the monocular camera unit 120 may be permitted to move relative to the UAV 110 with respect to up to six degrees of freedom. The monocular camera unit 120 may be directly mounted onto the UAV 110, or coupled to a support structure mounted onto the UAV 110. In some embodiments, the monocular camera unit 120 may be an element of a payload of the UAV 110. Since the monocular camera unit 120 is coupled to the UAV 110, the external state information of the monocular camera unit 120 may be considered as the external state of the UAV 110.

The monocular camera unit 120 may capture images of an environment of the UAV 110. The monocular camera unit 120 may capture images at a specified frequency to produce a series of image data over time. The series of image data obtained from the monocular camera unit 120 over time may be processed by a processor or processors to determine the external state information (e.g., position, orientation, and/or velocity) of the UAV 110 using any suitable method, such as a machine vision algorithm. For example, a machine vision algorithm can be used to identify one or more feature points within each image (e.g., an edge of an object, a corner of an object, or a boundary between objects of two different colors). Any suitable method or combination of methods may be used to identify and provide a digital representation of the feature points, such as the features from accelerated segment test (FAST) algorithm or the binary robust independent elementary features (BRIEF) algorithm. The image data may then be matched to each other to identify a set of common feature points appearing in the series of image data. The external state information of the UAV 110 may be determined based on the common feature points and a time interval between two images.

The UAV 110 may carry a proximity sensor 130 onboard to obtain a proximity data about the environment of the UAV 110. In some instances, the proximity sensor 130 may be used to measure a distance between the proximity sensor 130 and a target external to the UAV 110. Since the proximity sensor 130 is onboard the UAV 110, the distance between the proximity sensor 130 and a target external may be considered as the distance between the UAV 110 and the target external. The proximity sensor 130 may be a lidar sensor, an ultrasonic sensor, or an infrared sensor. The proximity sensor 130 may be directly mounted onto the UAV 110, or coupled to a support structure mounted onto the UAV 110. In some embodiments, the proximity sensor 130 may be an element of a payload of the UAV 110.

In some embodiments, the proximity sensor 130 may be rotated (e.g., rotated 360°) to obtain proximity data for a plurality of objects external to the UAV 110. The proximity data for the external objects may be analyzed to determine at least in part a relative proportional relationship. The relative proportional relationship may be used to update the determined external state information of the UAV 110, which is determined based on image data captured by the monocular camera, to obtain updated external state information of the UAV 110 for precise control and navigation during the autonomous flight.

The accuracy of the proximity sensor 130 may depend at least on a height of the UAV with respect to the external target. In some instances, the accuracy of the proximity sensor 130 may be less than or equal to 0.1 cm, 0.2 cm, 0.4 cm, 0.6 cm, 0.8 cm, 1 cm, 3 cm, 5 cm, 7 cm, 9 cm, 10 cm, 12 cm, 15 cm, 17 cm, 20 cm, 23 cm, 25 cm, 27 cm, 30 cm, 33 cm, 35 cm, 37 cm, 40 cm, 43 cm, 45 cm, 47 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the accuracy of the proximity sensor 130 may be less than or equal to any of the values described herein. The proximity sensor 130 may have a accuracy falling within a range between any two of the values described herein.

The detection range of the proximity sensor 130 may depend on environmental factors of the UAV. In some instances, the minimum distance in the detection range of the proximity sensor 130 may be equal to or more than 5 mm, 10 mm, 20 mm, 40 mm, 60 mm, 80 mm, 100 mm. Optionally, the minimum distance in the detection range of the proximity sensor 130 may be equal to or more than any of the values described herein. The proximity sensor 130 may have a minimum distance in the detection range falling within a range between any two of the values described herein. In some instances, the maximum distance in the detection range of the proximity sensor 130 may be equal to or more than 1 m, 5 m, 10 m, 15 m, 20 m, 25 m, 30 m, 35 m, 40 m, 45 m, 50 cm, 55 m, 60 m, 65 m, 70 m, 75 m, 80 m, 85 m, 90 m, 95 m, 100 m, 110 m, 120 m, 130 m, 140 m, 150 m, 160 m, 170 m, 180 m, 190 m, 200 m, 300 m, 400 m, 500 m, 600 m, 700 m, 800 m, 900 m, 1000 m, 1200 m, 1400 m, 1600 m, 1800 m, 2000 m, 2500 m, 3000 m, 3500 m, 4000 m, 4500 m, 5000 m, 5500 m, or 6000 m. Optionally, the maximum distance in the detection range of the proximity sensor 130 may be equal to or more than any of the values described herein. The proximity sensor 130 may have a maximum distance in the detection range falling within a range between any two of the values described herein.

In some embodiments, an initial positional relationship between the monocular camera unit 120 and the proximity sensor 130 may be measured and determined in advance and thus may be predetermined. The positional relationship may include at least a distance between the monocular camera unit 120 and the proximity sensor 130 and an angle of the proximity sensor 130 with respect to an optical axis of the monocular camera unit 120. For example, if the proximity sensor 130 is a lidar sensor, the distance between the monocular camera unit 120 and the lidar 130 may be a distance between the central lens point of the monocular camera unit 120 and the central point of the laser emission element of the lidar 130. For example, if the proximity sensor 130 is a lidar sensor, the angle of the proximity sensor 130 with respect to an optical axis of the monocular camera unit 120 may be a relative angle of a laser ray emitted from the lidar sensor with respect to an optical axis of the monocular camera.

In some instances, a distance between the monocular camera unit 120 and the proximity sensor 130 may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the distance between the monocular camera unit 120 and the proximity sensor 130 may be greater than or equal to any of the values described herein. The distance between the monocular camera unit 120 and the proximity sensor 130 may have a value falling within a range between any two of the values described herein.

In some instances, an angle of the proximity sensor 130 with respect to an optical axis of the monocular camera unit 120 may be less than or equal to 1°, 5°, 10°, 15°, 20°, 25°, 30°, 35°, 40°, 45°, 50°, 55°, 60°, 65°, 70°, 75°, 80°, 85°, 90°, 100°, 110°, 120°, 130°, 140°, 150°, 160°, 170° or 180°. Optionally, the angle of the proximity sensor 130 with respect to an optical axis of the monocular camera unit 120 may be greater than or equal to any of the values described herein. The angle of the proximity sensor 130 with respect to an optical axis of the monocular camera unit 120 may have a value falling within a range between any two of the values described herein.

The monocular camera unit 120 and the proximity sensor 130 may be mounted at any suitable portion of the UAV. In some instances, the monocular camera unit 120 may be mounted on the body of the UAV, or a payload of the UAV, or an arm of the UAV. Meanwhile, the monocular camera unit 120 may be mounted on the body of the UAV, or a payload of the UAV, or an arm of the UAV. In some instances, the monocular camera unit 120 may be mounted on the proximity sensor 130. Alternatively, the proximity sensor 130 may be mounted on the monocular camera unit 120.

The positional relationship between the monocular camera unit 120 and the proximity sensor 130 may be fixed or changed over time. In some instances, both the monocular camera unit 120 and the proximity sensor 130 may be fixed on the UAV during the flight of UAV. Alternatively, the monocular camera unit 120 may be fixed on the UAV while the proximity sensor 130 may be allowed to move rotationally or laterally relative to the UAV during the flight of UAV. Alternatively, the proximity sensor 130 may be fixed on the UAV while the monocular camera unit 120 may be allowed to move rotationally or laterally relative to the UAV during the flight of UAV. Optionally, both the monocular camera unit 120 and the proximity sensor 130 may be allowed to move rotationally or laterally relative to the UAV during the flight of UAV.

The positional relationship between the monocular camera unit 120 and the proximity sensor 130 may be measured before the flight of UAV and/or during the flight of UAV. The positional relationship may be measured periodically. In some instance, the positional relationship may be measured every 0.01 s, 0.02 s, 0.05 s, 0.07 s, 0.1 s, 0.2 s, 0.5 s, 0.7 s, 1.0 s, 1.5 s, 2.0 s, 2.5 s, 3.0 s, 3.5 s, 4.0 s, 4.5 s, 5.0 s, 5.5 s, 6.0 s, 6.5 s, 7.0 s, 7.5 s, 8.0 s, 8.5 s, 9.0 s, 9.5 s, or 10.0 s. The current positional relationship may be calculated based on a previous measurement of the positional relationship and a relative movement of the UAV since the previous measurement, with aid of one or more processors onboard or off-board the UAV.

In some instances, the predetermined positional relationship between the monocular camera unit 120 and the proximity sensor 130 may be stored in a memory unit onboard the UAV. Alternatively, the predetermined positional relationship may be received (e.g., using a wired or wireless connection) from a remote terminal before or during the flight.

The UAV 110 may carry a processing unit (not shown in FIG. 1) onboard. The processing unit may comprise a flight controller which controls an operation of the UAV 110. In some embodiments, the processing unit may further comprise one or more processors. In some instances, the processing unit may be configured to measure the positional relationship, estimate the external state information of the UAV from captured images, analyze the proximity data for the external objects to determine the relative proportional relationship, and/or apply the relative proportional relationship to the determined external state information. Alternatively, any of the measuring, estimating, analyzing and applying procedures may be performed by an off-board processing unit, for example, a remote terminal. Optionally, the measuring, estimating, analyzing and applying procedures may be performed by a combination of processing unit onboard the UAV and processing unit off-board the UAV.

In some instances, the environment of UAV 110 flight may be a relatively simple environment. The simple environment may be a natural environment or an artificial environment. A simple environment may be, for example, a clear open outdoor, a suburban area with less buildings, or an indoor place with few obstacles. Alternatively, the environment of UAV flight may be a relative complex environment. The relative complex environment may be a natural environment or an artificial environment. A relative complex environment may be, for example, a mountainous region with complex terrain, or an urban area with tall buildings. The UAV may be configured to move from a relatively simple environment to a relatively complex environment or vice versa. Based on the environment, the UAV may be configured to execute certain autonomous navigation routines. For example, the UAV may be configured to execute autonomous obstacle or collision avoidance routines so as to detect and avoid obstacles in its surrounding environment.

External objects include objects in the UAV's external environment. Examples of the external objects may include, but are not limited to, buildings, mountains, trees, roads, or vehicles. In some instances, the external object may be beneath, above or next to the UAV while the UAV is in flight. The external object may remain at a stationary height relative to an underlying surface of the environment, such as a ground or structure. The external object may be a stationary object on the ground, for example, a tree or a building. Alternatively, the external object may be a movable object, for example, a vehicle.

A distance from the UAV to external object may vary in different application fields. In some instances, the UAV may be away from the external object by a distance more than or equal to 1 cm, 3 cm, 5 cm, 8 cm, 10 cm, 15 cm, 20 cm, 25 cm, 30 cm, 35 cm, 40 cm, 45 cm, 50 cm, 60 cm, 70 cm, 80 cm, 90 cm, 1 m, 1.3 m, 1.5 m, 1.8 m, 2 m, 2.5 m, 3 m, 3.5 m, 4 m, 4.5 m, 5 m, 6 m, 7 m, 8 m, 9 m, 10 m, 13 m, 15 m, 18 m, 20 m, 23 m, 25 m, 28 m, 30 m, 35 m, 40 m, 45 m, 50 m, 55 m, 60 m, 65 m, 70 m, 80 m, 90 m, 100 m, 150 m, 200 m, 250 m, or 300 m. Optionally, the distance between the UAV and the external object may be greater than or equal to any of the values described herein. The distance between the UAV and the external object may have a greatest dimension falling within a range between any two of the values described herein.

Figure 2:
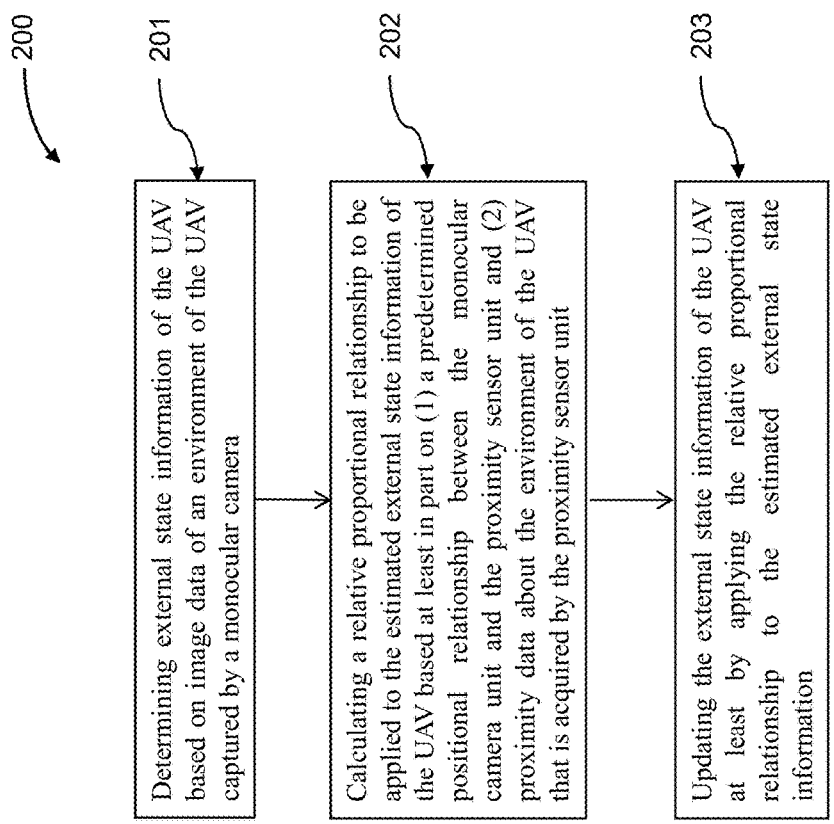
FIG. 2 illustrates a process for determining and updating a state of UAV in accordance with some embodiments.

FIG. 2 illustrates a process 200 for determining and updating a state of UAV in accordance with some embodiments. Aspects of the process 200 may be performed, individually or collectively, by one or more processors onboard the UAV, one or more processors off-board the UAV, or any combination thereof. Some or all aspects of the process 200 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

In step 201, external state information of the UAV may be determined based on image data of an environment of the UAV captured by the monocular camera unit onboard the UAV.

The external state information of the UAV may be the information of UAV relative to external objects. In some embodiments, the external state information of the UAV may include distance information relative to one or more external objects. In some embodiments, the external state information of the UAV may include position information of one or more external objects within the environment or position information of the UAV. In other embodiments, the external state information of the UAV may comprise a plurality of feature points, each associated with a first set of coordinates under a local reference frame. Since the monocular camera unit is mounted on the UAV, the external state information of the UAV may be equivalent to or otherwise derived from the external state of the monocular camera. In some embodiments, the external state of the UAV may not be equivalent to or otherwise derived from the external state of the monocular camera. In some embodiment, the external state information of the UAV, i.e., the external information of the monocular camera, may be acquired by analyzing feature points on the images captured by the monocular camera.

Although in step 201 the external state information of the UAV is described as estimated from images acquired from the monocular camera, the external state information of the UAV may be obtained from a stereo or multiple cameras. In some embodiments, for example, a pair of vision sensors (e.g., binocular cameras) may be used to estimate the external state of the UAV. In some embodiments, the pair of vision sensors are laterally spaced apart on the UAV such that each vision sensor provides an image from a different camera viewpoint, thereby enabling stereo vision imaging. For example, the pair of vision sensors may be separated laterally by up to 1 m, 500 cm, 250 cm, 100 cm, 50 cm, 25 cm, 10 cm, 5 cm, 2 cm, or 1 cm. The vision sensors can be disposed on the same side of the UAV or opposite sides of the UAV. One or more vision sensors can be disposed on the front, rear, top, bottom, or lateral sides of the UAV, or suitable combinations thereof.

In some embodiments, raw image data obtained by the camera can be processed by image analysis to correct the image data, for example, by implementing an algorithm to correct optical distortion and/or noise in the image data. The image analysis can extract suitable feature points from the corrected image data and generate a digital representation of the feature points, as previously described herein.

In some embodiments, frame-to-frame matching of the feature points produced by the image analysis can be performed using an initial estimation of the positional change, thereby reducing the complexity of the search and improving matching efficiency and accuracy. For example, the initial estimation can be generated based on two-way sensor fusion of the IMU and the GPS sensor onboard the UAV. The IMU can provide velocity data with respect to six degrees of freedom that can be compared with positional information from the previous frame to provide a measurement of positional change ($\tilde{R}_I$, $\tilde{T}_I$). The GPS sensor can provide measurement data of the positional change of the movable object, $\tilde{T}_G$ (e.g., with respect to three degrees of translation). In some embodiments, the GPS measurement data can be assigned a weight value δ, as described herein. The weight value δ can range from 0 to 1 based on the strength of the GPS signal. For example, in an environment where the GPS signal is weak, δ can be close to 0. In an environment where the GPS signal is strong, δ can be close to 1. Examples of an environment where the GPS signal can be weak can include an indoor environment, obstructions by structures or naturally occurring features, inclement weather conditions, lack of satellites overhead, or malfunction with a GPS receiver. Examples of environments where the GPS signal can be strong can include an outdoor environment, high altitude, lack of obstructions, or clear weather conditions. In one scenario, a movable object may be flying at low altitude surrounded by a number of tall buildings. This may result in blocking or weakening satellite signals, which may correspondingly cause the data from the GPS system to be accorded lower weight. This may result in data from the GPS system being discounted relative to other sensing systems that have no indication of being compromised. Accordingly, the IMU data ($\tilde{R}_I$, $\tilde{T}_I$) and the GPS sensor data (δ, $\tilde{T}_G$) can be fused using any suitable sensor fusion method as described herein (e.g., a Kalman filter) to generate an initial estimation of the positional change of the movable object ($\tilde{R}$, $\tilde{T}$).

The initial estimation ($\tilde{R}$, $\tilde{T}$) can be used to search for a feature point in a current frame, $m_t^i$, (in which i represents the $i^{th}$ feature point and t represents the current time) corresponding to the same feature point in a previous frame, $m_{t-1}^i$. For example, the estimated 3D coordinate $\hat{p}_{t-1}^i=(\hat{x}_{t-1}^i, \hat{y}_{t-1}^i, \hat{z}_{t-1}^i)$ of the feature point $m_{t-1}^i$ can be rotated according to ($\tilde{R}$, $\tilde{T}$) to obtain $\tilde{R}\cdot\hat{p}_{t-1}^i+\tilde{T}$. The estimated 3D coordinate $\hat{m}_t^i=K\Pi_0(\tilde{R}\cdot\hat{p}_{t-1}^i+\tilde{T})$ can be projected to obtain the position of the feature point after the rotation $\hat{m}_t^i=(\hat{u}_t^i, \hat{v}_t^i)$, where K is the internal parameter matrix for the camera and $\Pi_0$ is the projection matrix. The current frame can then be searched and matched for the feature point within a ($\hat{u}_t^i, \hat{v}_t^i$) area, with a point $m_t^i=(u_t^i, v_t^i)$ having the minimal planar distance from ($\hat{u}_t^i, \hat{v}_t^i$) considered to be the corresponding point. Accordingly, the frame-to-frame relationship between the feature points $m_{t-1}^i$ and $m_t^i$ can be determined.

The determined/estimated external state information of the UAV in step 201 may be inaccurate due to an accumulation of errors over time. For example, a deviation between the estimated external state information and the actual state information may become larger as time elapses, so that a reliability of the visual navigation is reduced. Therefore, the external state estimated from the monocular camera unit may need to be updated using data from a different sensor in order to improve the accuracy. For example, the external state estimated from the monocular camera unit may be updated using external state information measured by a different type of sensor. The different sensor for updating the estimated external state may be any type of sensor other than a monocular camera, not limited to a proximity sensor as described herein as an embodiment. In some instances, the different sensor may be a GPS sensor, a motion sensor, an inertial sensor, or an image sensor.

In step 202, a relative proportional relationship may be calculated. The relative proportional relationship may be applied to the determined external state information of the UAV which is obtained in step 201. The relative proportional relationship may be calculated based at least in part on: (1) a predetermined positional relationship between the monocular camera unit and a proximity sensor and (2) proximity data about the environment of the UAV that is acquired by the proximity sensor.

In some embodiments, the proximity data may include a distance to an external object which is measured by the proximity sensor.

In some embodiments, the relative proportional relationship may include a scale factor. The scale factor may include a number or a transformation function that can be used to convert coordinates under a first reference frame to coordinates under a second reference frame, as discussed in further detail in FIG. 3. In some instances, the first reference frame may be a local reference frame, for example, an image reference frame, and the second reference frame may be a global reference frame. In some embodiments, the proximity sensor may include at least one of a lidar sensor, an ultrasound sensor, or an infrared sensor. A detailed discussion on a calculation of the relative proportional relationship will be provided in FIG. 3.

In step 203, the determined external state information of the UAV of step 201 may be updated, individually or collectively by the one or more processors onboard or off-board the UAV, at least by applying the calculated relative proportional relationship of step 202 to the determined external state information. For example, the determined external state information of UAV may be multiplied by the relative proportional relationship.

In some embodiments, not all the feature points on an image captured by the monocular camera unit or pair of vision sensors may be detected by the proximity sensor. The relative proportional relationship may be calculated from those feature points which are detectable by the proximity sensor, and then applied to those feature points which are not detectable by the proximity sensor, as will be provided in FIG. 3.

By performing the process described in FIG. 2, the updated external state information of UAV may be obtained, which is more precise or even equal to the actual state information of the UAV. In some embodiments, the estimated external state information may be updated periodically. In some instance, the estimated external state information may be updated every 0.01 s, 0.02 s, 0.05 s, 0.07 s, 0.1 s, 0.2 s, 0.5 s, 0.7 s, 1.0 s, 1.5 s, 2.0 s, 2.5 s, 3.0 s, 3.5 s, 4.0 s, 4.5 s, 5.0 s, 5.5 s, 6.0 s, 6.5 s, 7.0 s, 7.5 s, 8.0 s, 8.5 s, 9.0 s, 9.5 s, or 10.0 s.

Figure 3:
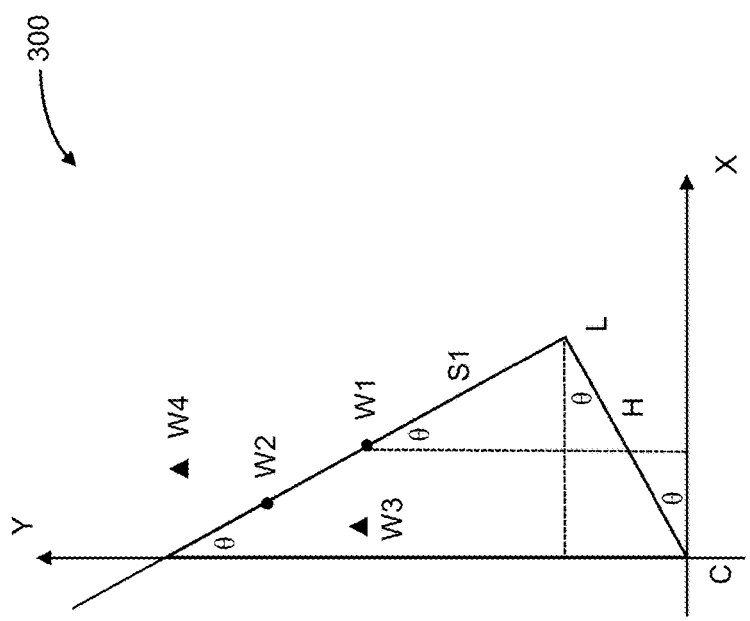
FIG. 3 illustrates an exemplary calculation of a relative proportional relationship which is to be applied on the determined external state information of the UAV, in accordance with an embodiment of the invention.

FIG. 3 illustrates an exemplary calculation 300 of a relative proportional relationship which is to be applied on the determined external state information of the UAV, in accordance with an embodiment of the invention.

In the embodiment of FIG. 3, the external state information may include a plurality of feature points, each associated with a first set of coordinates under a first reference frame. The feature points within each image captured by the monocular camera unit may include, but not limited to, an edge of an object, a corner of an object, or a boundary between objects of two different colors. Any suitable method or combination of methods may be used to identify and provide a digital representation of the feature points, as discussed herein above. The image data may then be frame-to-frame matched to each other to identify a set of common feature points appearing in the series of image data. The external state information of the UAV may be determined based on the common feature points and a time interval between two images, as discussed above.

In the embodiment of FIG. 3, the relative proportional relationship may be a scale factor. This scale factor may be a scale between the second reference frame and the first reference frame. The first reference frame may be a local reference frame, for example, an image reference frame. The second reference frame may be a global reference frame.

The X-Y coordinate system of FIG. 3 may be a local reference frame, for example, an image reference frame or a camera reference frame in which the camera is located at the origin. As shown in FIG. 3, the location of the monocular camera unit C may be set as the origin of the X-Y coordinates, and a lidar sensor L may be used as the proximity sensor. A positional relationship between the monocular camera unit C and the lidar sensor L may be predetermined. In some instances, a relative distance H and a relative angle θ of a laser ray emitted from the lidar sensor L with respect to an optical axis of the monocular camera unit C may be measured and predetermined in advance. Alternatively, the a relative distance H and a relative angle θ of a laser ray emitted from the lidar sensor L with respect to an optical axis of the monocular camera unit C may be determined during the flight of UAV. Optionally, a relative distance H and a relative angle θ of a laser ray emitted from the lidar sensor L with respect to an optical axis of the monocular camera unit C may be calculated based on a previous measurement of the positional.

In some instances, determining external state information of the UAV may comprise extracting the plurality of feature points from the image data; and determining the first sets of coordinates respectively associated with the plurality of feature points under the first reference frame.

In some instances, the proximity data may include proximity information for a first feature point of the plurality of feature points and does not include proximity information for a second feature point of the plurality of feature points.

In a set of feature points [W1, W2, W3, . . . , Wn] on an image captured by the monocular camera unit C, some of the feature points may be detected and measured by the lidar sensor L while others may not. Accordingly, the set of feature points [W1, W2, W3, . . . , Wn] may be classified into two subsets: a first subset of proximity sensor detectable feature points, and a second subset of proximity sensor non-detectable feature points. For example, the lidar sensor L may detect feature points W1 and W2 because they are in the line of the emitted laser, but may not detect feature points W3 and W4 because they are out of the line of the emitted laser. In the embodiment of FIG. 3, the lidar sensor L may measure a distance to a detectable feature point W1 as S1. Since the UAV and/or lidar sensor L can move, the lidar sensor L may detect different points at different times. For example, the lidar sensor L may detect feature points W1 and W2 the first time; but may detect feature points W3 the second time if the position/direction of the lidar sensor L rotates.

In some instances, calculating the relative proportional relationship may include: determining a second set of coordinates under a second reference frame for the first feature point based on (1) the proximity information for the first feature point and (2) the predetermined positional relationship between the monocular camera unit and the proximity sensor unit; and using the first set of coordinates and the second set of coordinates for the first feature point to determine the relative proportional relationship. The first reference frame may be a local reference frame, for example, an image reference frame or camera reference frame. The second reference frame may be a global reference frame.

Regardless of being detectable or non-detectable by the lidar sensor, the coordinate cn (xn, yn) associated with any one of feature point Wn under the local reference frame (e.g., the image reference frame) may be measured and determined by any known methods, such as monocular SLAM, which is a method for determining a coordinate of arbitrary feature based on single camera. In some instances, the coordinate associated with the lidar sensor detectable feature point W1 under the local reference frame may be measured as c1 (x1, y1). The coordinate C1 (X1, Y1) of the same feature point W1 under the global reference frame may then be calculated based on (1) the predetermined relative distance H, the predetermined relative angle θ and (2) the measured distance S1 as:

$$X1 = H \times \cos \theta - S1 \times \sin \theta$$

$$Y1 = H \times \sin \theta + S1 \times \cos \theta$$

Here, a scale factor λ for updating the determined external state information of the UAV may be calculated by:

$$\lambda = C1/c1$$

In some embodiments, the scale factor λ may be determined based on multiple points. For example, the scale factor λ may be an average value of a number of calculated scale factors that are calculated based on a number of points in accordance with the above method.

The calculated scale factor λ may then be used to update the determined external state information of UAV. For example, as discussed herein above, the scale factor λ which is calculated from those feature points which are detectable by the proximity sensor, may be applied to update those feature points which are not detectable by the proximity sensor.

In some embodiments, the calculated scale factor λ may be applied to update the distance information of the UAV relative to one or more external objects within the environment. In other embodiments, the calculated scale factor λ may be applied to update the position information of one or more external objects within the environment or position information of the UAV. For example, the calculated scale factor λ may be applied to update the world coordinates of one or more external objects or world coordinates of the UAV. In other embodiments, the calculated scale factor λ may be applied to update the coordinates of the feature points. In some instances, the scale factor λ may be used to transform or translate coordinates under a first coordinate system (e.g., in pixels) to coordinates under a second coordinate system (e.g., in meters).

In some embodiments, updating the external state information may include applying the relative proportional relationship to the first set of coordinates associated with at least one of the plurality of feature points under a first reference frame to obtain a second set of coordinates under a second reference frame.

For example, in the embodiment of FIG. 3, the calculated scale factor λ may be a scale between the global reference frame and the local reference frame. By applying the calculated scale factor λ to a local coordinate cn (xn, yn) of a feature point Wn in the set of feature points [W1, W2, W3, ..., Wn], the global coordinate Cn (Xn, Yn) of this feature point Wn may be calculated by:

$$Cn = \lambda * cn$$

In some instances, the coordinate of a proximity sensor non-detectable feature point Wn under a second reference frame may be calculated by applying the calculated scale factor λ to the coordinate of Wn under a first reference frame which is already known.

In some instances, the coordinate of a proximity sensor detectable feature point Wn under a second reference frame may also be calculated by applying the calculated scale factor λ to the coordinate of Wn under a first reference frame.

In other instances, the coordinate of any feature point Wn under a second reference frame may also be calculated by applying the calculated scale factor λ to the coordinate of Wn under a first reference frame, regardless of being detectable or non-detectable by the proximity sensor.

In some instances, the position and/or orientation of the camera and/or the proximity sensor may change during the UAV's flight. Therefore, the value of the scale factor λ may change over time as a result of a change in the positional relationship between the camera and the proximity sensor. For example, the monocular camera unit may rotate about a pitch axis, roll axis, and/or yaw axis thereof. A rotating of the camera may at least lead to a change in a relative angle θ of a laser ray emitted from the lidar sensor with respect to an optical axis of the monocular camera. For another example, the orientation of the lidar sensor may change during the UAV's flight, which may also lead to a change in the discussed relative angle θ. For another example, the scale factor λ may need to be re-estimated if the monocular SLAM fails. Therefore, the scale factor λ may be calculated and updated each time a lidar sensor detectable feature point is detected by the lidar sensor, such that the scale factor is up to date. In some embodiments, the scale factor λ may be calculated and updated at a regular interval. The regular interval for updating the scale factor λ may be 0.01 s, 0.02 s, 0.05 s, 0.07 s, 0.1 s, 0.2 s, 0.5 s, 0.7 s, 1.0 s, 1.5 s, 2.0 s, 2.5 s, 3.0 s, 3.5 s, 4.0 s, 4.5 s, 5.0 s, 5.5 s, 6.0 s, 6.5 s, 7.0 s, 7.5 s, 8.0 s, 8.5 s, 9.0 s, 9.5 s, or 10.0 s. Optionally, the regular interval for updating the scale factor λ may be greater than or equal to any of the values described herein.

Figure 4:
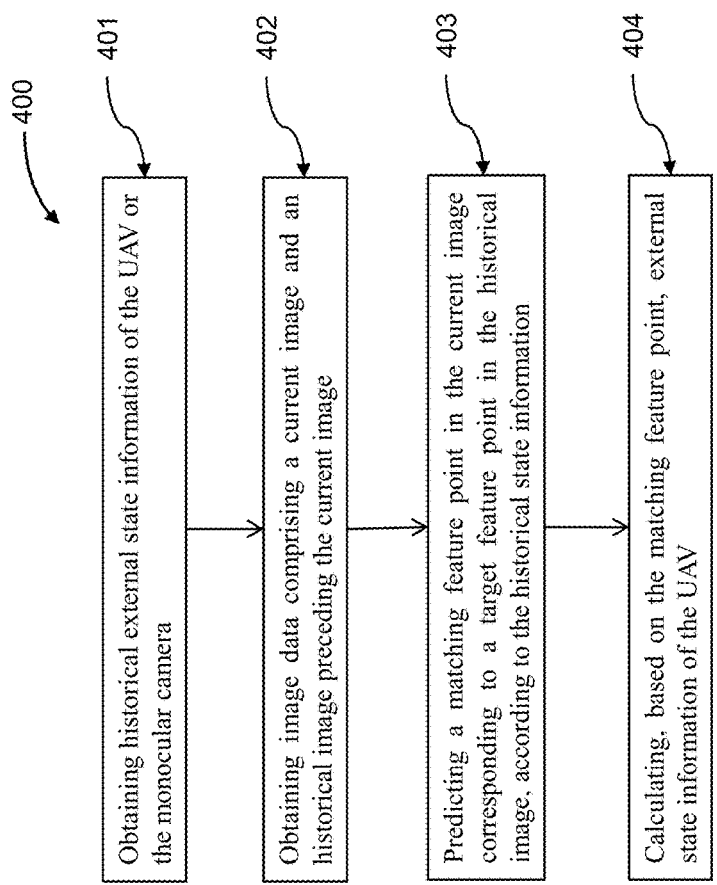
FIG. 4 illustrates a process for determining an external state of UAV based on image data, in accordance with an embodiment of the invention.

FIG. 4 illustrates a process 400 for determining an external state of UAV based on image data, in accordance with an embodiment of the invention.

In step 401, historical external state information of the UAV may be obtained. The external information may comprise distance information relative to an external object, while the internal information may include one or more of acceleration information, direction information, angular speed information, speed information or mileage information. In some instances, an external sensor such as a laser sensor or an ultrasonic sensor may be employed to measure the distance relative to the external object, and an internal sensor such as an acceleration sensor, direction sensor or a mileage sensor may be employed to measure internal information such as acceleration, direction or mileage.

In some embodiments, the historical state information of the UAV may include, but not limited to, distance information of the UAV relative to one or more external objects within the environment, position information of one or more external objects within the environment or position information of the UAV, and/or a plurality of feature point each associated with a first set of coordinates under a first reference model.

In step 402, image data comprising a current image and an historical image preceding the current image may be obtained.

In some instances, the monocular camera unit may capture a series of images of an environment of the UAV over time. In this case, the historical image may be an image captured before a predetermined time unit with respect to current image, from among a series of image frames. This predetermined time unit may be 0.1 s, 0.3 s, 0.5 s, 0.8 s, 1 s, 2 s, 3 s, 4 s, 5 s, 6 s, 7 s, 8 s, 9 s, 10 s, 11 s, 12 s, 13 s, 14 s, 15 s, 16 s, 17 s, 18 s, 19 s, 20 s, 23 s, 25 s, 28 s, 30 s, 35 s, 40 s, or 60 s. The predetermined time unit may have a value within a range between any two of the values described herein.

The current image may be obtained in real time from the monocular camera. In some instances, the historical image preceding the current image may be read from a memory onboard the UAV which stores the captured images. The memory for storing the captured images may be a non-transitory computer readable medium, which may include one or more memory units (e.g., removable media or external storage such as an SD card or random access memory (RAM)). Alternatively, the historical image may be received from a remote terminal, for example a remote data storage or a remote computing device.

In step 403, a matching feature point in the current image corresponding to a target feature point in the historical image may be predicted, according to the historical state information.

The historical image and current image captured by the monocular camera unit may include information of many external objects such as trees and buildings, and any edge corner point of these objects may be used as a target feature point. The historical external state information may include information characterizing a motion vector such as direction and speed of the UAV, therefore, the matching feature point in current image, which corresponds to the target feature point in the historical image, may be predicted according to the motion vector information.

In some instances, predicting the matching feature point in current image may include: predicting a coordinate position of the target feature point of the historical image in the current image according to the historical state information; and selecting a feature point that is closest to the predicted coordinate position as the matching feature point in the current image.

In step 404, current external state information of the UAV may be calculated, based on the matching feature point.

In some embodiments, a Kalman filter may be used in this step to calculate the current external state information of the UAV. In other embodiments, a measurement model may be incorporated in this step to calculate the current external state information of the UAV, as will be discussed hereinafter.

In some embodiments, the external information of the UAV may be calculated from the matching feature point. For example, a distance of an external object relative to the UAV may be obtained by calculating a distance from the UAV to the matching feature point by using the coordinate of the matching feature point.

Although the embodiment of FIG. 4 is discussed as calculating external information of UAV based on historical external state information, the internal information of the UAV may also be calculated from the matching feature point. For example, speed information of the UAV may be calculated based on the coordinate of the target feature point, the coordinate of the matching feature point and the interval of time between the current image and the historical image.

The calculated external information of the UAV may then be updated by applying a relative proportional relationship, which may be calculated by a process as described in step 202 of FIG. 2 and particularly the process as described above with reference to FIG. 3.

In the embodiment of FIG. 4, the external state information of the UAV may be determined based on image data of an environment of the UAV captured by the monocular camera unit onboard the UAV. However, the present invention may determine the external state information of the UAV based on visual data acquired from other types of optical sensors in connection with data fusion techniques.

Figure 5:
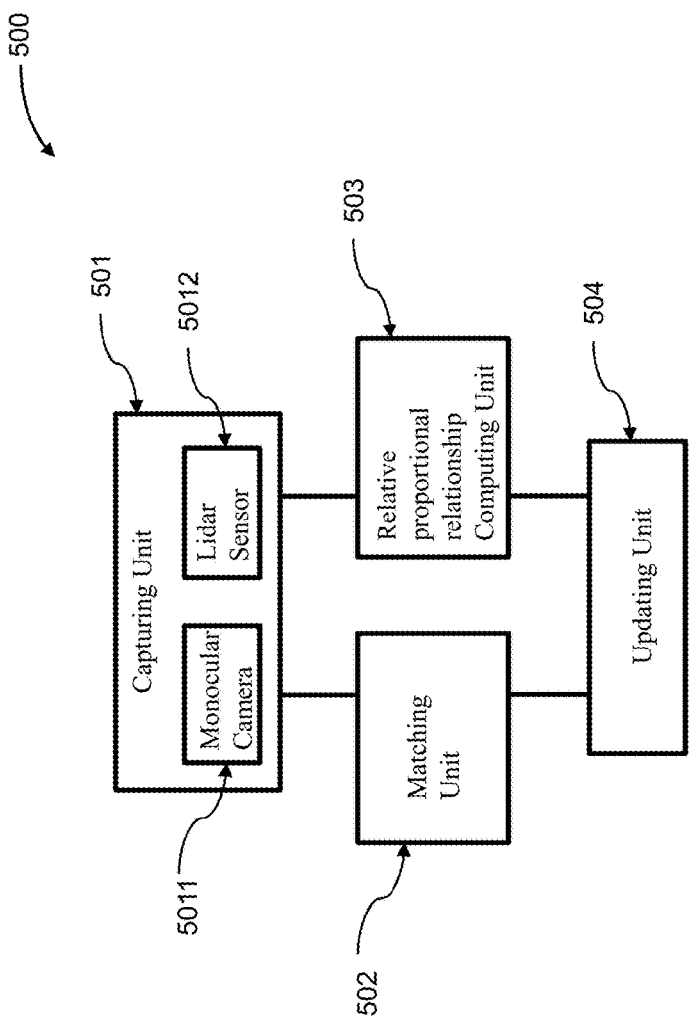
FIG. 5 is a schematic illustration by way of block diagram of a system for determining an external state of UAV in accordance with an embodiment of the present invention.

FIG. 5 is a schematic illustration by way of block diagram of a system 500 for determining an external state of UAV in accordance with an embodiment of the present invention. The system 500 for determining an external state of UAV in accordance with an embodiment of the present invention may include a capturing unit 501, a matching unit 502, a relative proportional relationship computing unit 503 and a updating unit 504. The capturing unit 501 may be coupled to the matching unit 502 and the relative proportional relationship computing unit 503. The matching unit 502 and the relative proportional relationship computing unit 503 may be coupled to the updating unit 504. In an embodiment, the capturing unit 501 may for example comprise a monocular camera unit 5011 and a Lidar sensor 5012.

The operating of the system 500 may be performed with the aid of one or more processors. The processor may be provided as part of control circuit of the UAV, or may be implemented by the flight controller of the UAV, or may be provided as an independent circuit, module or chip. The processor may be implemented by Central Processing Unit (CPU), Application Specific Integrated Circuit (ASIC), or Field Programmable Gate Array (FPGA). Any description herein of a processor may apply to one or more processors, which may individually or collectively perform any functions described for the processor. The processor may be capable of executing one or more steps in accordance with non-transitory computer readable media comprising code, logic, or instructions for performing one or more steps. Memory storage units may be provided which may comprise the non-transitory computer readable media.

One or more processors may be provided onboard the UAV. The signals and information may be processed onboard the UAV. One or more processors may be provided off-board the UAV. The signals and information may be processed off-board the UAV. In some instances, one or more processors may be distributed over the UAV and one or more external devices, or over a plurality of external devices. The processors that may be distributed over the UAV and/or devices may individually or collectively generate the processed signals.

The capturing unit 501 may obtain historical external state information of the UAV, a current image acquired by the monocular camera unit and an historical image preceding the current image. The capturing unit 501 may also obtain a proximity data from the lidar sensor 5012. For example, the proximity data is a distance between the lidar sensor 5012 and an object external to the UAV, as discussed herein above. The capturing unit 501 may also obtain a positional relationship between the monocular camera unit 5011 and the lidar sensor 5012, which for example is a relative distance H and a relative angle θ of a laser ray emitted from the lidar sensor 5012 with respect to an optical axis of the monocular camera unit 5011, as discussed herein above.

The external state information of UAV at the time of taking off may be initialized (e.g., set to zero), and the external state information at each time unit after UAV's taking off may be related to the external state information at the previous time unit. Since the monocular camera unit is fixed to the UAV, the external state information of the UAV may be considered as the state information of the monocular camera. In some instances, the external state information may at least comprise the posture, position, speed, direction, coordinates and surrounding environmental information of the UAV.

The historical external state information of the UAV, current image acquired by the monocular camera unit and historical image preceding the current image may then be provided to the matching unit 502. The matching unit 502 may be configured to: (1) according to the historical state information, predict a matching feature point in the current image corresponding to a target feature point in the historical image; and (2) estimate, from the matching feature point, current external information of the UAV. The determined current external information of the UAV may be outputted to the updating unit 504 for further processing.

The image captured by the monocular camera unit 5011 may include information of many external objects such as trees and buildings, and any edge corner point of these objects may be used as a target feature point. The historical external state information may include information characterizing a motion vector such as direction and speed of the UAV, therefore, the matching feature point in current image, which corresponds to the target feature point in the historical image, may be predicted according to the motion vector information.

In some instances, the matching unit 502 may predict a coordinate position in the current image according to the historical state information and the target feature point in the historical image, and select, as the matching feature point in current image, a feature point that is closest to the predicted coordinate position.

In some instances, a displacement of the coordinate position of the target feature point may be obtained by using the historical external state information so as to predict the coordinate position of the target feature point in the current image. This process may be implemented by feature matching algorithms as discussed hereinabove, including but not limited to an optical flow method, or a matching method based on feature descriptors.

The external information of the UAV may be calculated from the matching feature point. For example, a distance of an external object relative to the UAV may be obtained by calculating a distance from the UAV to the matching feature point by using the coordinate value of the current feature point. For another example, speed information of the UAV may be calculated based on the coordinate value of the current feature point, the coordinate value of the target feature point and the interval of time unit.

The relative proportional relationship computing unit 503 may calculate a relative proportional relationship, based at least in part on: (1) a predetermined positional relationship between the monocular camera unit 5011 and the lidar sensor 5012, which is for example a relative distance H and a relative angle θ of a laser ray emitted from the lidar sensor 5012 with respect to an optical axis of the monocular camera unit 5011, as discussed herein; and (2) a proximity data from the lidar sensor 5012, which for example is a distance between the lidar sensor 5012 and an object external to the UAV, as discussed herein above, which are input from the capturing unit 501. This relative proportional relationship may be applied to update the determined external state information, which is the output of the matching unit 502.

The calculating process for the relative proportional relationship may be substantially identical to that described with reference to FIG. 3. The calculated relative proportional relationship, which is the output of the relative proportional relationship computing unit 503, and the determined external state information of UAV, which is the output of the matching unit 502, may then be fed to the updating unit 504.

The updating unit 504 may update the determined external state information of UAV by applying the relative proportional relationship. For example, the updating unit 504 may be configured to multiply the determined external state information of UAV by the relative proportional relationship. To this end, the updated external state information of UAV is obtained, which is more precise or even equal to the actual state information of the UAV.

Figure 6:
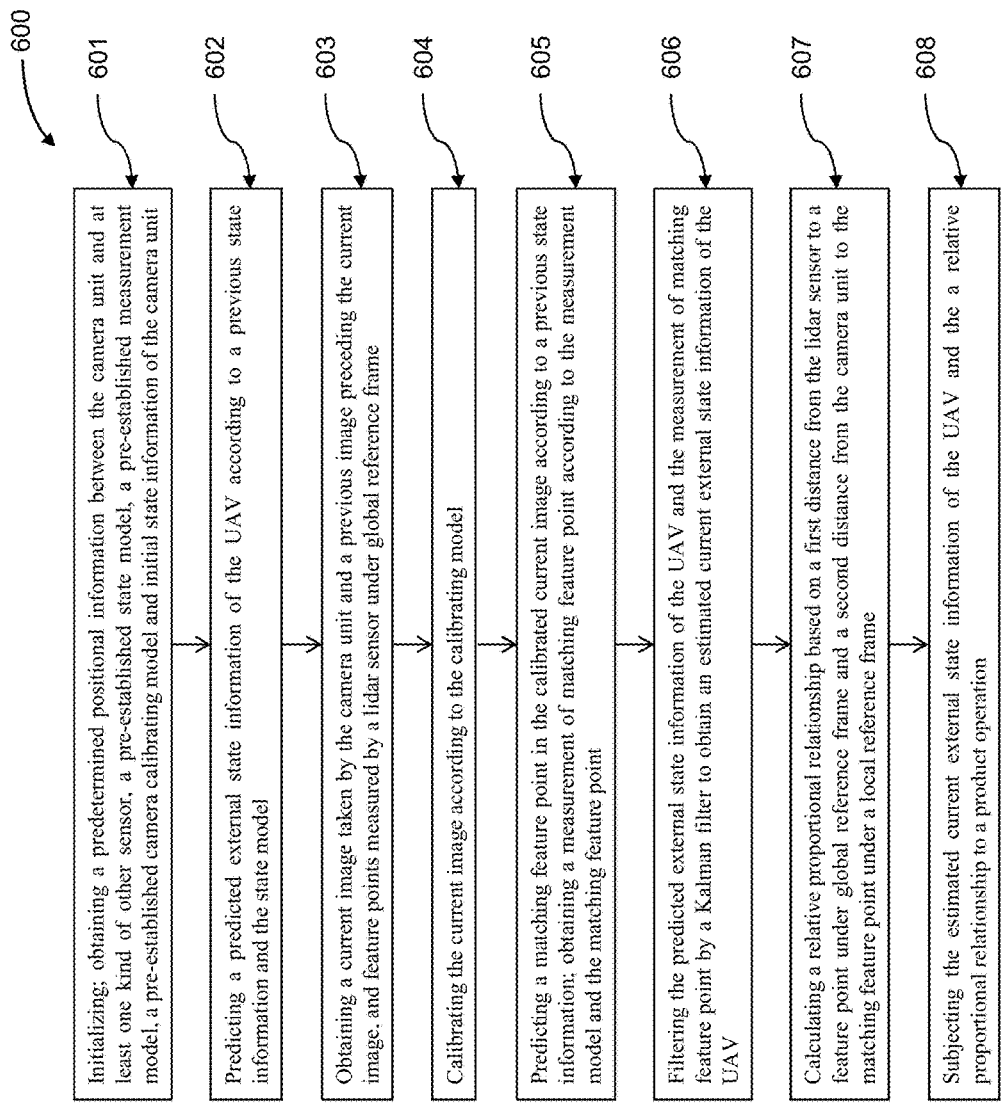
FIG. 6 is a flow chart illustrating a method of determining and updating a state of UAV by applying a Kalman filter, in accordance with an embodiment of the invention.

FIG. 6 is a flow chart illustrating a method 600 of determining and updating a state of UAV by applying Kalman filter, in accordance with an embodiment of the invention. The Kalman filter is an algorithm that uses a series of measurements observed over time, containing noise (random variations) and other inaccuracies, and produces estimates of unknown variables that tend to be more precise than those based on a single measurement alone. In some embodiments, Kalman filter may be used to estimate the current state information of a UAV. Alternatively, Extended Kalman filter (EKF) may be used. In the embodiment of FIG. 6, the current external of UAV may be obtained by applying a historical external state information to a pre-established state model and a pre-established measurement model.

In some embodiments, state model may indicate how the state propagate to the next timestamp, for example:

$$\begin{pmatrix} v_{t+1} \\ a_{t+1} \end{pmatrix} = \begin{pmatrix} v + a_t t \\ a_t \end{pmatrix}$$

wherein v is a velocity, a is an acceleration, and $$\begin{pmatrix} v \\ a \end{pmatrix}$$

is a state.

In some embodiments, measurement model may indicate how the state is measured.

In step 601, the UAV may be Initialized, and a predetermined positional information between the camera unit and at least one kind of other sensor, a pre-established state model, a pre-established measurement model, a pre-established camera calibrating model and the initial state information of the camera unit may be obtained.

In some embodiments, the predetermined positional information between the camera unit and at least one kind of other sensor may be similar to that discussed in step 202 of FIG. 2 and that in FIG. 3, for example, a predetermined positional relationship between a monocular camera unit and a proximity sensor onboard the UAV may be obtained.

The pre-established state model, pre-established measurement model, pre-established camera calibrating model may be established in advance.

In some embodiments, an equation of the state model may be:

$$x(k|k-1)=Ax(k-1|k-1)+BU(k)+w(k)$$

In the equation of state model, k is a time coefficient, $x(k|k-1)$ is a predicted external state information, $x(k-1|k-1)$ is an estimated previous external state information, $U(k)$ is a known input quantity, w is a process noise, and A and B are state parameters.

In some embodiments, an equation of the measurement model may be:

$$Z(k)=Hx(k|k-1)+v(k)$$

In the an equation of measurement model, $Z(k)$ is a measurement of the matching feature point, v is process noise, and H is a measurement parameter.

In step 602, a predicted external state information of the UAV may be predicted according to a previous state information and the state model.

In step 603, a current image taken by the camera unit and a previous image preceding the current image may be acquired, and feature points measured by a lidar sensor under global reference frame may be obtained.

In step 604, the current image may be calibrated according to the pre-established calibrating model. An example of an uncalibrated and calibrated image is provided in FIG. 8 and FIG. 9, respectively.

In step 605, a matching feature point in the calibrated current image may be predicted according to previous state information; and a measurement of matching feature point may be obtained according to the measurement model and the predicted matching feature point. The process of predicting a matching feature point may be identical to steps 401-403 as discussed in FIG. 4, as discussed herein above. In the equation of the measurement model, $x(k|k-1)$ is the target feature point, and is one parameter in the predicted external state information of the UAV.

In step 606, the predicted external state information of the UAV and the measurement of matching feature point may be filtered by a Kalman filter to obtain estimated current state information of the UAV. The time updating equation of the Kalman filter may be:

$$x(k|k)=x(k|k-1)+G(k)(Z(k)-Hx(k|k-1))$$

$$G(k)=P(k|k-1)H'/(HP(k|k-1)H'+R)$$

In the above time updating equation of the Kalman filter, $x(k|k)$ is an estimated external state information, $G(k)$ is a Kalman gain, $P(k|k-1)$ is a covariance corresponding to $x(k|k-1)$, R is a covariance of v, and H' is a transposed matrix of H.

In step 607, a relative proportional relationship may be calculated based on a first distance from the lidar sensor to a feature point under global reference frame and a second distance from the camera unit to the matching feature point under a local reference frame. The process of calculating the relative proportional relationship in step 607 may be similar to those discussed in step 202 in FIG. 2 and those discussed in FIG. 3.

In step 608, the estimated current external state information of the UAV and the a relative proportional relationship may be subjected to a product operation, such that the estimated current external state information may be updated to obtain an updated external state information of UAV, which may be more precise or even equal to the actual state information of the UAV. This updating process in step 608 may be similar to that discussed in step 203 of FIG. 2.

In some embodiments, the determined external state information of the UAV may be fed to other types of filters, including but not limited to an Extended Kalman filter.

Figure 7:
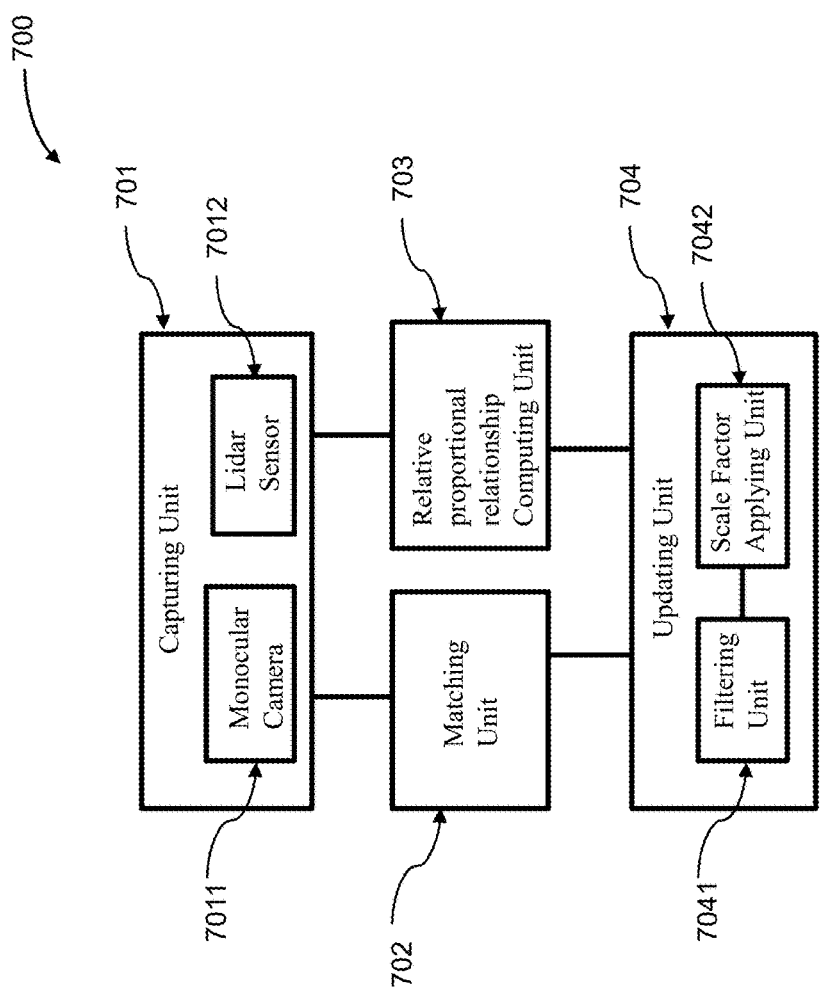
FIG. 7 is a schematic illustration by way of block diagram of a system for determining and updating an external state of UAV in accordance with an embodiment of the present invention.

FIG. 7 is a schematic illustration by way of block diagram of a system 700 for determining and updating a state of UAV in accordance with an embodiment of the present invention. Components of the system may be onboard/offboard the UAV.

As shown in FIG. 7, the system 700 for determining a state of UAV in accordance with an embodiment of the present invention may include a capturing unit 701, a matching unit 702, a relative proportional relationship computing unit 703 and an updating unit 704. The capturing unit 701 may be coupled to the matching unit 702 and the relative proportional relationship computing unit 703. The matching unit 702 and the relative proportional relationship computing unit 703 may be coupled to the updating unit 704. In an embodiment, the capturing unit 701 may also comprise a monocular camera unit 7011 and a Lidar sensor 7012.

The operation of the capturing unit 701, the matching unit 702 and the relative proportional relationship computing unit 703 in system 700 of the embodiment may be substantially identical to the capturing unit 501, matching unit 502 and the relative proportional relationship computing unit 503 in system 500 of the embodiment shown in FIG. 5, as discussed herein above. The functionalities of the system 700 may be performed with the aid of one or processors on board or off-board. The calculated relative proportional relationship, which is the output of the relative proportional relationship computing unit 703, and the determined external state information of UAV, which is the output of the matching unit 702, may be fed to the updating unit 704.

The updating unit 704 of this embodiment may comprise a filtering unit 7041 and relative proportional relationship applying unit 7042 which are interconnected. The filtering unit 7041 may be configured to apply a Kalman filter to the historical external state information of the UAV according to a pre-established state model and a pre-established measurement model, to obtain an estimated current external state information of UAV. Then, the estimated current external state information of UAV may be fed to the relative proportional relationship applying unit 7042, which may be configured to update the estimated current external state information of UAV by applying the relative proportional relationship. For example, the relative proportional relationship applying unit 7042 may be configured to multiply the estimated current external state information of UAV by the relative proportional relationship. To this end, the updated external state information of UAV may be obtained, which is more precise or even equal to the actual state information of the UAV.

In some instances, the optimized external state information of the UAV may be calculated by applying other types of filters, including but not limited to an Extended Kalman filter.

Figure 8:
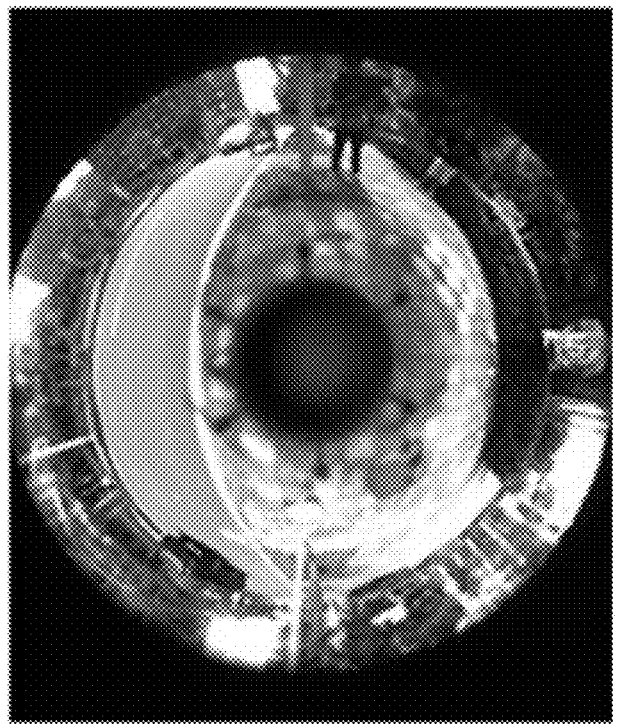
FIG. 8 shows an original image captured by the monocular camera, which is a panoramic type, as an example of image calibration in accordance with an embodiment of the present invention.
Figure 9:
FIG. 9 shows a calibrated image after column-expansion calibration as an example of image calibration in accordance with an embodiment of the present invention.

FIG. 8 shows an original image 800 captured by the monocular camera, which is a panoramic type, as an example of image calibration in accordance with an embodiment of the present invention. FIG. 9 shows a calibrated image 900 after column-expansion calibration as an example of image calibration in accordance with an embodiment of the present invention.

The calibration of panoramic cameras may be similar to that for calibrating standard perspective cameras. The calibration methods of panoramic cameras may take advantage of planar grids that are shown by the user at different positions and orientations. For omnidirectional cameras, it is very important that the calibration images are taken all around the camera and not on a single side only. This aims to compensate for possible misalignments between the camera and mirror. Three open-source calibration toolboxes may be currently available for Matlab, which differ mainly for the projection model adopted and the type of calibration pattern. The first calibration toolbox is Mei, which uses checkerboard-like images and takes advantage of the projection model of Geyer and Daniilidis. It may be particularly suitable for catadioptric cameras using hyperbolic, parabolic, folded mirrors, and spherical mirrors. The second calibration toolbox is Barreto, which uses line images instead of checkerboards. Like the toolbox of Mei, it may also use the projection model of Geyer and Daniilidis. It may be particularly suitable for parabolic mirrors. Finally, the toolbox of Scaramuzza uses checkerboard-like images. Contrary to the previous two, it takes advantage of the unified Taylor model for catadioptric and fisheye cameras. It may work with catadioptric cameras using hyperbolic, parabolic, folded mirrors, spherical, and elliptical mirrors. Additionally, it may work with a wide range of fisheye lenses available on the market, such as Nikon, Sigma, Omnitech-Robotics, and many others, with field of view up to 195 degrees. Contrary to the previous two toolboxes, this toolbox may feature an automatic calibration process. In fact, both the center of distortion and the calibration points may be detected automatically without any user intervention.

In some embodiments, before determining the external state information of UAV based on image data captured by the monocular camera, the image data may be calibrated according to a pre-determined calibration model. In some embodiments, calibrating the image data may include: obtaining a coordinate mapping relationship between arbitrary point in an external space and a corresponding point in an image acquired by the monocular camera unit according to the pre-established calibration model of the monocular camera; and modifying the image according to the coordinate mapping relationship. The calibration model can correspond to one or more components or parameters of the camera unit such as characteristics of a reflection mirror of the camera unit.

For example, in order to increase the field of view (FOV) of the monocular camera unit, the monocular camera unit may configured to take panoramic images. For example, the monocular camera unit may further comprise a reflection mirror for reflecting external light rays into the monocular camera. In this case, after obtaining the current image captured by the camera unit, the method of determining a state of UAV may further include: obtaining a coordinate mapping relationship between arbitrary point in an external space and a corresponding point in the current image captured by the monocular camera, according to a pre-established calibration model corresponding to the reflection mirror; and calibrating the current image captured by the monocular camera unit by using the coordinate mapping.

In some instances, a curved surface of the reflection mirror may be a parabola or a hyperbola. Taking a parabola as an example, the imaging point of the monocular camera unit may be located on the directrix of the parabola, and a line connecting the focal point of the parabola and the imaging point may be perpendicular to the directrix. Since a distance from arbitrary point on the parabola to the directrix is equal to a distance to the focal point, a calibration model may be built according to this property, thereby a coordinate mapping relationship between arbitrary point in an external space and a corresponding point in the current image captured by the monocular camera unit may be obtained according to the calibration model, and the coordinate mapping relationship may be used to calibrate when the current image of the monocular camera unit is expanded. As shown in FIG. 8, although the current image 800 before calibration is severely affected by the reflection mirror, a correct image shown in FIG. 9 may be obtained through column-expansion calibration.

In some instances, the image calibration process may be performed each time an image is captured by the monocular camera, in case a panoramic type monocular camera unit is used on the UAV. For example, before determining the external state information of the UAV in step 201 according to the embodiment shown in FIG. 2, a step of calibrating the captured image may be performed. For another example, before predicting a matching feature point in the current image in step S402 according to the embodiment shown in FIG. 4, a step of calibrating the captured image may be performed to obtain the calibrated image. Alternatively, the image calibration process may be performed after a number of images have been taken. Alternatively, the image calibration process may be optional and omitted in some embodiments, for example, in case the monocular camera unit is not a panoramic type or in case the image taken by the monocular camera unit is not distorted. In some embodiments, the image calibration may be performed by processors onboard the UAV. Alternatively, the image calibration may be performed by remote terminals, for example a remote computing device. In some instances, the image calibration may be an automatic process. For instances, the image may be automatically calibrated each time an image is captured by the monocular camera, or each time a predetermined number of images are captured by the monocular camera, or at a predetermined interval. Alternatively, the image calibration may be performed in response to predetermined events. For example, the image calibration may be performed upon receiving a user's instruction.

The systems and methods described herein can be applied to a wide variety of movable objects. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein.

The UAV may be an aerial vehicle. The UAV may have one or more propulsion units that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV may be a rotorcraft. In some instances, the UAV may be a multi-rotor craft that may include a plurality of rotors. The plurality or rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation being parallel to one another. In some instances, the rotors may have axes of rotation that are at any angle relative to one another, which may affect the motion of the UAV. The rotation of the rotors may be driven by one or more motors coupled to the rotors.

A battery may be coupled to the UAV. The battery may be coupled to a UAV to provide power to one or more components of the UAV. The battery provide power to one or more propulsion units, flight controller, sensor, inertial measurement unit, communication unit, and/or any other component of the UAV while coupled to the UAV. Examples of sensors of the UAV may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras), proximity sensors (e.g., ultrasonic sensors, lidar sensors, or infrared sensors), inertial sensors (e.g., accelerometers, gyroscopes, inertial measurement units (IMUs)), altitude sensors, pressure sensors (e.g., barometers), audio sensors (e.g., microphones), or field sensors (e.g., magnetometers, electromagnetic sensors).

A carrier may be provided to support a payload. For example, a carrier for cameras on a UAV may be a gimbal-stabilized platform. The carrier may be generally equipped with a yaw motor, a roll motor and/or a pitch motor such that the gimbal may rotate about one, two, or three axes of rotation. The camera may be installed on a terminal or seat of the gimbal. By the actuation of the motors, the gimbal may independently adjust the yaw angle, roll angle and/or pitch angle of the camera. These motors may be either driven by the battery or battery assembly installed inside of the body of UAV, or by a dedicated battery of the gimbal. In the actuation of these motors, noise may be generated.

The propulsion system of the UAV may include one or more rotors. A rotor may include one or more blades (e.g., one, two, three, four, or more blades) affixed to a central shaft. The blades may be disposed symmetrically or asymmetrically about the central shaft. The blades may be turned by rotation of the central shaft, which can be driven by a suitable motor or engine. The blades may be configured to spin in a clockwise rotation and/or a counterclockwise rotation. The rotor may be a horizontal rotor (which may refer to a rotor having a horizontal plane of rotation), a vertically oriented rotor (which may refer to a rotor having a vertical plane of rotation), or a rotor tilted at an intermediate angle between the horizontal and vertical positions. In some embodiments, horizontally oriented rotors may spin and provide lift to the movable object. Vertically oriented rotors may spin and provide thrust to the movable object. Rotors oriented an intermediate angle between the horizontal and vertical positions may spin and provide both lift and thrust to the movable object. One or more rotors may be used to provide a torque counteracting a torque produced by the spinning of another rotor.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 10:
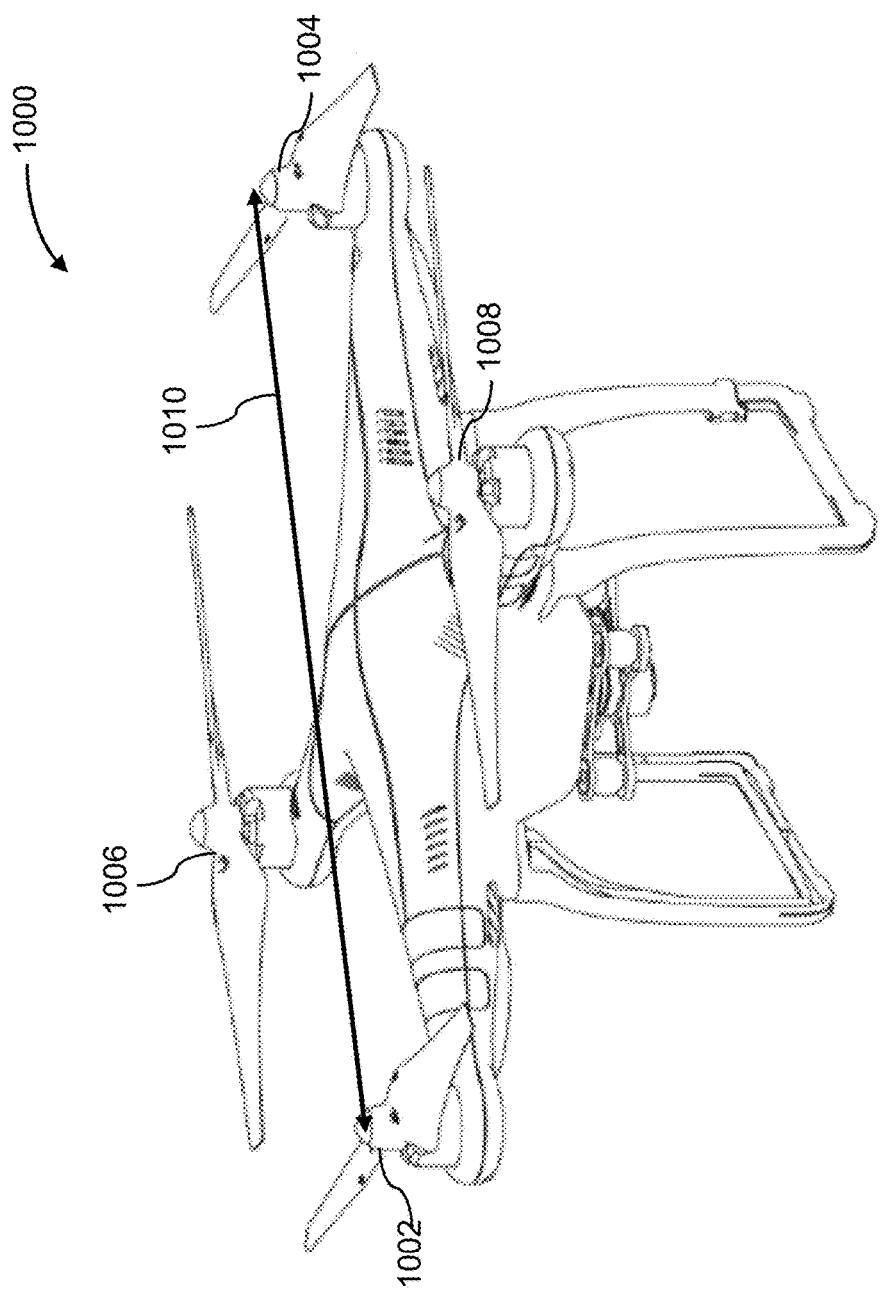
FIG. 10 illustrates an exemplary movable object in accordance with embodiments of the present invention.

FIG. 10 illustrates an unmanned aerial vehicle (UAV) 1000, in accordance with embodiments of the present invention. The UAV may be an example of a movable object as described herein. The UAV 1000 can include a propulsion system having four rotors 1002, 1004, 1006, and 1008. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1010. For example, the length 1010 can be less than or equal to 2 m, or less than or equal to 5 m. In some embodiments, the length 1010 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touch-screen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 11:
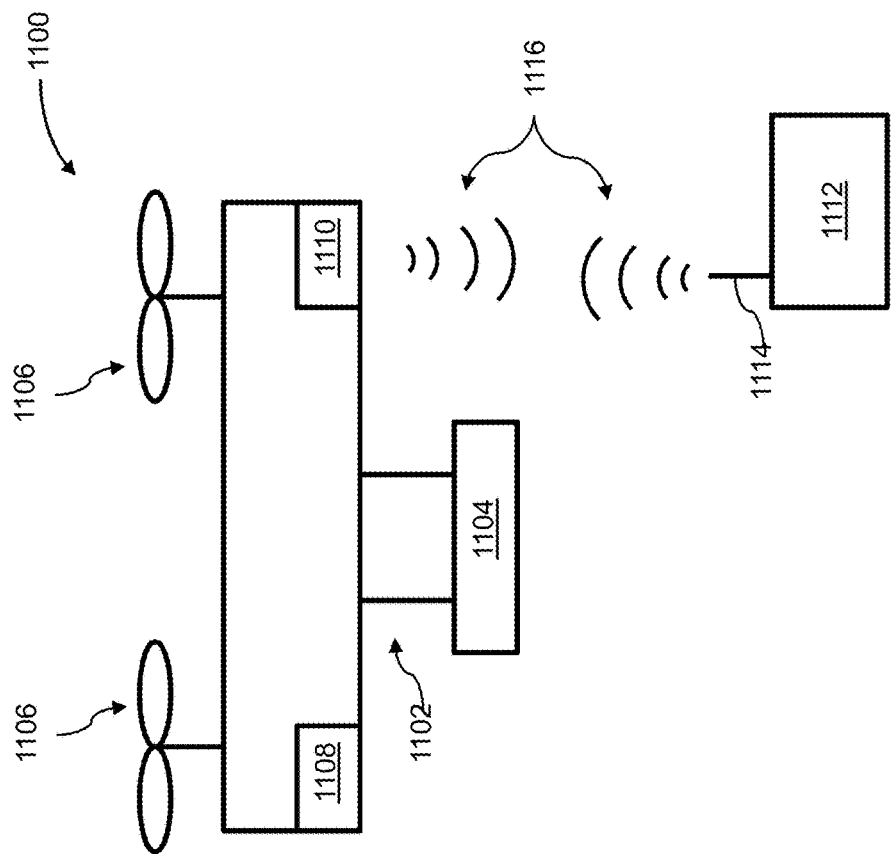
FIG. 11 illustrates a movable object including a carrier and a payload, in accordance with embodiments of the present invention.

FIG. 11 illustrates a movable object 1100 including a carrier 1102 and a payload 1104, in accordance with embodiments of the present invention. Although the movable object 1100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1104 may be provided on the movable object 1100 without requiring the carrier 1102. The movable object 1100 may include propulsion mechanisms 1106, a sensing system 1108, and a communication system 1110.

The propulsion mechanisms 1106 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1106 can be mounted on the movable object 1100 using any suitable means, such as a support element (e.g., a drive shaft) as described elsewhere herein. The propulsion mechanisms 1106 can be mounted on any suitable portion of the movable object 1100, such on the top, bottom, front, back, sides, or suitable combinations thereof.

In some embodiments, the propulsion mechanisms 1106 can enable the movable object 1100 to take off vertically from a surface or land vertically on a surface without requiring any horizontal movement of the movable object 1100 (e.g., without traveling down a runway). Optionally, the propulsion mechanisms 1106 can be operable to permit the movable object 1100 to hover in the air at a specified position and/or orientation. One or more of the propulsion mechanisms 1100 may be controlled independently of the other propulsion mechanisms. Alternatively, the propulsion mechanisms 1100 can be configured to be controlled simultaneously. For example, the movable object 1100 can have multiple horizontally oriented rotors that can provide lift and/or thrust to the movable object. The multiple horizontally oriented rotors can be actuated to provide vertical takeoff, vertical landing, and hovering capabilities to the movable object 1100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1100 (e.g., with respect to up to three degrees of translation and up to three degrees of rotation).

The sensing system 1108 can include one or more sensors that may sense the spatial disposition, velocity, and/or acceleration of the movable object 1100 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1108 can be used to control the spatial disposition, velocity, and/or orientation of the movable object 1100 (e.g., using a suitable processing unit and/or control module, as described below). Alternatively, the sensing system 1108 can be used to provide data regarding the environment surrounding the movable object, such as weather conditions, proximity to potential obstacles, location of geographical features, location of manmade structures, and the like.

The communication system 1110 enables communication with terminal 1112 having a communication system 1114 via wireless signals 1116. The communication systems 1110, 1114 may include any number of transmitters, receivers, and/or transceivers suitable for wireless communication. The communication may be one-way communication, such that data can be transmitted in only one direction. For example, one-way communication may involve only the movable object 1100 transmitting data to the terminal 1112, or vice-versa. The data may be transmitted from one or more transmitters of the communication system 1110 to one or more receivers of the communication system 1112, or vice-versa. Alternatively, the communication may be two-way communication, such that data can be transmitted in both directions between the movable object 1100 and the terminal 1112. The two-way communication can involve transmitting data from one or more transmitters of the communication system 1110 to one or more receivers of the communication system 1114, and vice-versa.

In some embodiments, the terminal 1112 can provide control data to one or more of the movable object 1100, carrier 1102, and payload 1104 and receive information from one or more of the movable object 1100, carrier 1102, and payload 1104 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1106), or a movement of the payload with respect to the movable object (e.g., via control of the carrier 1102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1108 or of the payload 1104). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1112 can be configured to control a state of one or more of the movable object 1100, carrier 1102, or payload 1104. Alternatively or in combination, the carrier 1102 and payload 1104 can also each include a communication module configured to communicate with terminal 1112, such that the terminal can communicate with and control each of the movable object 1100, carrier 1102, and payload 1104 independently.

In some embodiments, the movable object 1100 can be configured to communicate with another remote device in addition to the terminal 1112, or instead of the terminal 1112. The terminal 1112 may also be configured to communicate with another remote device as well as the movable object 1100. For example, the movable object 1100 and/or terminal 1112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1100, receive data from the movable object 1100, transmit data to the terminal 1112, and/or receive data from the terminal 1112. Optionally, the remote device can be connected to the Internet or other telecommunications network, such that data received from the movable object 1100 and/or terminal 1112 can be uploaded to a website or server.

Figure 12:
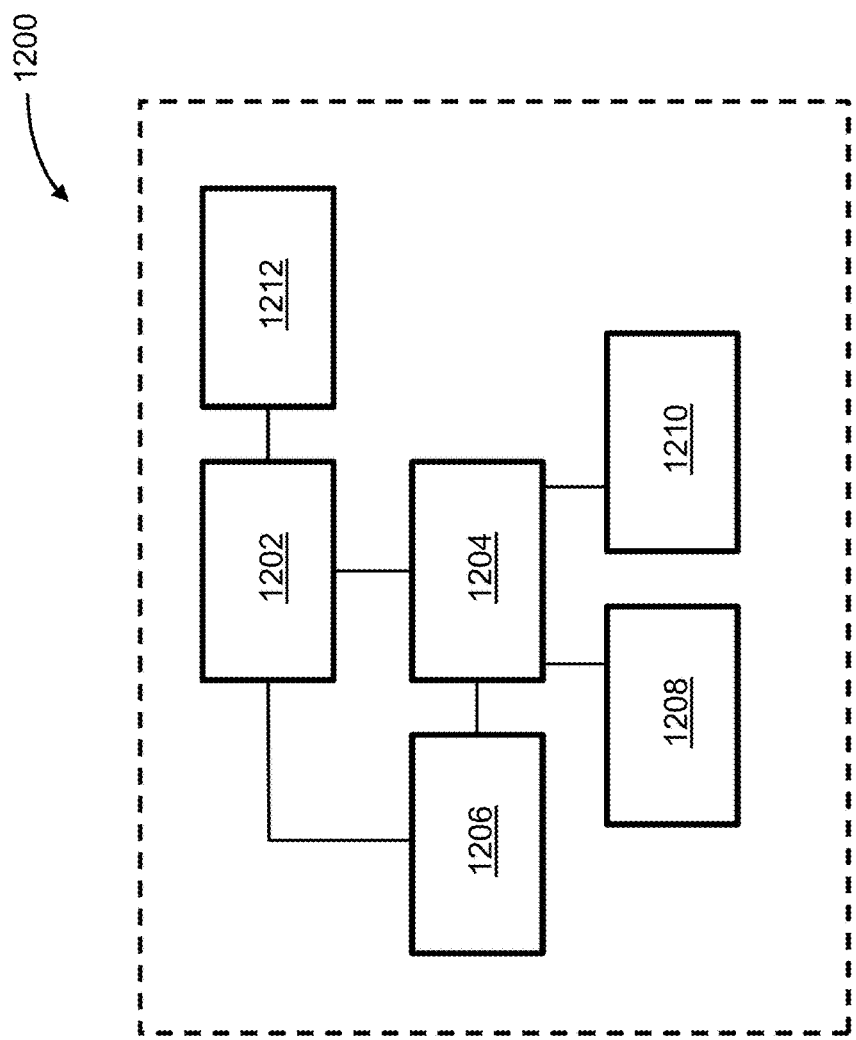
FIG. 12 is a schematic illustration by way of block diagram of a system for controlling a movable object, in accordance with embodiments of the present invention.

FIG. 12 is a schematic illustration by way of block diagram of a system 1200 for controlling a movable object, in accordance with embodiments of the present invention. The system 1200 can be used in combination with any suitable embodiment of the systems, devices, and methods disclosed herein. The system 1200 can include a sensing module 1202, processing unit 1204, non-transitory computer readable medium 1206, control module 1208, and communication module 1210.

The sensing module 1202 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1202 can be operatively coupled to a processing unit 1204 having a plurality of processors. In some embodiments, the sensing module can be operatively coupled to a transmission module 1212 (e.g., a Wi-Fi image transmission module) configured to directly transmit sensing data to a suitable external device or system. For example, the transmission module 1212 can be used to transmit images captured by a camera of the sensing module 1202 to a remote terminal.

The processing unit 1204 can have one or more processors, such as a programmable processor (e.g., a central processing unit (CPU)). The processing unit 1204 can be operatively coupled to a non-transitory computer readable medium 1206. The non-transitory computer readable medium 1206 can store logic, code, and/or program instructions executable by the processing unit 1204 for performing one or more steps. The non-transitory computer readable medium can include one or more memory units (e.g., removable media or external storage such as an SD card or random access memory (RAM)). In some embodiments, data from the sensing module 1202 can be directly conveyed to and stored within the memory units of the non-transitory computer readable medium 1206. The memory units of the non-transitory computer readable medium 1206 can store logic, code and/or program instructions executable by the processing unit 1204 to perform any suitable embodiment of the methods described herein. For example, the processing unit 1204 can be configured to execute instructions causing one or more processors of the processing unit 1204 to analyze sensing data produced by the sensing module. The memory units can store sensing data from the sensing module to be processed by the processing unit 1204. In some embodiments, the memory units of the non-transitory computer readable medium 1206 can be used to store the processing results produced by the processing unit 1204.

In some embodiments, the processing unit 1204 can be operatively coupled to a control module 1208 configured to control a state of the movable object. For example, the control module 1208 can be configured to control the propulsion mechanisms of the movable object to adjust the spatial disposition, velocity, and/or acceleration of the movable object with respect to six degrees of freedom. Alternatively or in combination, the control module 1208 can control one or more of a state of a carrier, payload, or sensing module.

The processing unit 1204 can be operatively coupled to a communication module 1210 configured to transmit and/or receive data from one or more external devices (e.g., a terminal, display device, or other remote controller). Any suitable means of communication can be used, such as wired communication or wireless communication. For example, the communication module 1210 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1210 can transmit and/or receive one or more of sensing data from the sensing module 1202, processing results produced by the processing unit 1204, predetermined control data, user commands from a terminal or remote controller, and the like.

The components of the system 1200 can be arranged in any suitable configuration. For example, one or more of the components of the system 1200 can be located on the movable object, carrier, payload, terminal, sensing system, or an additional external device in communication with one or more of the above. Additionally, although FIG. 12 depicts a single processing unit 1204 and a single non-transitory computer readable medium 1206, one of skill in the art would appreciate that this is not intended to be limiting, and that the system 1200 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1200 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for determining an external state of an unmanned aerial vehicle (UAV), said method comprising:
   determining, individually or collectively by one or more processors onboard the UAV, external state information of the UAV based on image data of an environment of the UAV captured by a monocular camera onboard the UAV;
   calculating, individually or collectively by the one or more processors onboard the UAV, a relative proportional relationship to be applied to the external state information of the UAV based at least in part on (1) a predetermined positional relationship between the monocular camera and a proximity sensor and (2) proximity data about the environment of the UAV that is acquired by the proximity sensor, the relative proportional relationship including a proportional relationship between coordinates under a local reference frame based on the monocular camera and coordinates under a global reference frame;
   updating, individually or collectively by the one or more processors onboard the UAV, the external state information of the UAV at least by applying the relative proportional relationship to the external state information; and
   controlling the UAV according to the updated external state information.

2. The method of claim 1, wherein the relative proportional relationship comprises a scale factor.

3. The method of claim 1, wherein the proximity data includes a distance to an external object within the environment.

4. The method of claim 1, wherein the external state information comprises distance information of the UAV relative to one or more external objects within the environment.

5. The method of claim 1, wherein the external state information comprises position information of one or more external objects within the environment or position information of the UAV.

6. The method of claim 1, wherein the external state information includes a plurality of feature points, each associated with a first set of coordinates under the local reference frame.

7. The method of claim 6, wherein updating the external state information includes applying the relative proportional relationship to the first set of coordinates associated with at least one of the plurality of feature points to obtain a second set of coordinates under the global reference frame.

8. The method of claim 6, wherein the proximity data includes proximity information for a first feature point of the plurality of feature points and does not include proximity information for a second feature point of the plurality of feature points.

9. The method of claim 8, wherein determining the external state information of the UAV comprises:
   extracting the plurality of feature points from the image data; and
   determining the first sets of coordinates respectively associated with the plurality of feature points under the local reference frame.

10. The method of claim 8, wherein calculating the relative proportional relationship comprises:
   determining a second set of coordinates under the global reference frame for the first feature point based on the proximity information for the first feature point and the predetermined positional relationship between the monocular camera and the proximity sensor; and
   using the first set of coordinates and the second set of coordinates for the first feature point to determine the relative proportional relationship.

11. The method of claim 8, wherein updating the external state information comprises applying the relative proportional relationship to the first set of coordinates associated with the second feature point to obtain a second set of coordinates for the second feature point under the global reference frame.

12. The method of claim 1, wherein updating the external state information of the UAV comprises applying a Kalman filter to the external state information according to a pre-established state model and a pre-established measurement model.

13. A system for determining an external state of an unmanned aerial vehicle (UAV), said system comprising:
   a monocular camera configured to capture image data of an environment of the UAV;
   a proximity sensor configured to acquire proximity data about the environment of the UAV; and
   one or more processors configured to, individually or collectively:
      determine external state information of the UAV based on the image data captured by the monocular camera;
      calculate a relative proportional relationship to be applied to the external state information of the UAV based at least in part on (1) a predetermined positional relationship between the monocular camera and the proximity sensor and (2) the proximity data, the relative proportional relationship including a proportional relationship between coordinates under a local reference frame based on the monocular camera and coordinates under a global reference frame;
      update the external state information of the UAV at least by applying the relative proportional relationship to the external state information; and
      control the UAV according to the updated external state information.

14. The system of claim 13, wherein the relative proportional relationship comprises a scale factor.

15. The system of claim 13, wherein the external state information includes a plurality of feature points, each associated with a first set of coordinates under the local reference frame.

16. The system of claim 15, wherein updating the external state information includes applying the relative proportional relationship to the first set of coordinates associated with at least one of the plurality of feature points to obtain a second set of coordinates under the global reference frame.

17. The system of claim 15, wherein the proximity data includes proximity information for a first feature point of the plurality of feature points and does not include proximity information for a second feature point of the plurality of feature points.

18. The system of claim 17, wherein determining the external state information of the UAV comprises:
   extracting the plurality of feature points from the image data; and
   determining the first sets of coordinates respectively associated with the plurality of feature points under the local reference frame.

19. The system of claim 17, wherein calculating the relative proportional relationship comprises:
   determining a second set of coordinates under the global reference frame for the first feature point based on the proximity information for the first feature point and the predetermined positional relationship between the monocular camera and the proximity sensor; and
   using the first set of coordinates and the second set of coordinates for the first feature point to determine the relative proportional relationship.

20. The system of claim 17, wherein updating the external state information comprises applying the relative proportional relationship to the first set of coordinates associated with the second feature point to obtain a second set of coordinates for the second feature point under the global reference frame.

* * * * *